United States Patent
Hamano

(10) Patent No.: US 9,936,122 B2
(45) Date of Patent: Apr. 3, 2018

(54) CONTROL APPARATUS, CONTROL METHOD, AND NON-TRANSITORY COMPUTER-READABLE STORAGE MEDIUM FOR PERFORMING FOCUS CONTROL

(71) Applicant: CANON KABUSHIKI KAISHA, Tokyo (JP)

(72) Inventor: Hideyuki Hamano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 14/845,509

(22) Filed: Sep. 4, 2015

(65) Prior Publication Data
US 2016/0080634 A1 Mar. 17, 2016

(30) Foreign Application Priority Data
Sep. 11, 2014 (JP) ................. 2014-184771

(51) Int. Cl.
*H04N 5/232* (2006.01)
*H04N 9/04* (2006.01)
(Continued)

(52) U.S. Cl.
CPC ......... *H04N 5/23212* (2013.01); *G02B 7/365* (2013.01); *G02B 13/26* (2013.01);
(Continued)

(58) Field of Classification Search
CPC . G02B 7/28; G02B 7/285; G02B 7/36; G02B 7/365; G02B 13/26; H04N 5/23212; H04N 9/045; H04N 9/64; G03B 13/36
See application file for complete search history.

(56) References Cited

U.S. PATENT DOCUMENTS 7,456,886 B2   11/2008   Shinohara
7,515,200 B2   4/2009   Yasuda
(Continued)

FOREIGN PATENT DOCUMENTS

CN   1402077 A   3/2003
CN   102346288 A   2/2012
(Continued)

OTHER PUBLICATIONS

Extended European Search Report dated Jan. 19, 2016, in Application No. 15184383.6.
(Continued)

*Primary Examiner* — Dennis Hogue
(74) *Attorney, Agent, or Firm* — Fitzpatrick, Cella, Harper & Scinto

(57) ABSTRACT

A control apparatus (125) includes an acquirer (125*d*) configured to acquire first information relating to a peak position of a spatial frequency that an image pickup optical system transmits for each spatial frequency, and a processor (125*e*, 125*f*, 125*g*) configured to calculate second information relating to a first evaluation band used for processing of image pickup signals and a second evaluation band used for processing of focus detection signals, the processor is configured to calculate third information relating to a weighting for each spatial frequency, and the processor is configured to calculate correction information of focus detection based on the first, second, and third information.

7 Claims, 17 Drawing Sheets

(51) Int. Cl.
    *G02B 7/36*         (2006.01)
    *G03B 13/36*      (2006.01)
    *G02B 13/26*      (2006.01)
    *H04N 9/64*       (2006.01)

(52) U.S. Cl.
    CPC .............. *H04N 9/045* (2013.01); *G03B 13/36* (2013.01); *H04N 9/64* (2013.01)

(56) References Cited

U.S. PATENT DOCUMENTS

| | | |
|---|---|---|
| 8,160,437 B2 | 4/2012 | Hamano |
| 8,259,216 B2 | 9/2012 | Abe |
| 8,654,227 B2 | 2/2014 | Hashimoto et al. |
| 8,754,979 B2 | 6/2014 | Tomita |
| 2009/0066830 A1 | 3/2009 | Fujii et al. |
| 2010/0194966 A1* | 8/2010 | Abe .................... G02B 7/38 348/345 |
| 2013/0010179 A1 | 1/2013 | Takahara et al. |
| 2014/0009666 A1 | 1/2014 | Hamano |
| 2016/0006948 A1 | 1/2016 | Takao |

FOREIGN PATENT DOCUMENTS

| | | |
|---|---|---|
| CN | 102854704 A | 1/2013 |
| EP | 2 963 492 A1 | 1/2016 |
| JP | 9-297259 A | 11/1997 |
| JP | 2004-134867 A | 4/2004 |
| JP | 2010-078810 A | 4/2010 |
| JP | 2010-117679 A | 5/2010 |
| JP | 5087077 B2 | 11/2012 |
| JP | 2013-029656 A | 2/2013 |
| JP | 2013029656 A * | 2/2013 |

OTHER PUBLICATIONS

Officce Action dated Dec. 28, 2017, in Chinese Patent Application No. 201510580505.4.

* cited by examiner

|  | ZOOM POSITION | | | | | | | |
|---|---|---|---|---|---|---|---|---|
|  | 1 | 2 | 3 | 4 | 5 | 6 | 7 | 8 |
| 1 | BP111 | BP112 | BP113 | BP114 | BP115 | BP116 | BP117 | BP118 |
| 2 | BP121 | BP122 | BP123 | BP124 | BP125 | BP126 | BP127 | BP128 |
| 3 | BP131 | BP132 | BP133 | BP134 | BP135 | BP136 | BP137 | BP138 |
| 4 | BP141 | BP142 | BP143 | BP144 | BP145 | BP146 | BP147 | BP148 |
| 5 | BP151 | BP152 | BP153 | BP154 | BP155 | BP156 | BP157 | BP158 |
| 6 | BP161 | BP162 | BP163 | BP164 | BP165 | BP166 | BP167 | BP168 |
| 7 | BP171 | BP172 | BP173 | BP174 | BP175 | BP176 | BP177 | BP178 |
| 8 | BP181 | BP182 | BP183 | BP184 | BP185 | BP186 | BP187 | BP188 |

FOCUS POSITION

FIG. 9

| | | 1 | 2 | 3 | 4 | 5 | 6 | 7 | 8 |
|---|---|---|---|---|---|---|---|---|---|
| | | | | | ZOOM POSITION | | | | |
| FOCUS POSITION | 1 | BP211 | BP212 | BP213 | BP214 | BP215 | BP216 | BP217 | BP218 |
| | 2 | BP221 | BP222 | BP223 | BP224 | BP225 | BP226 | BP227 | BP228 |
| | 3 | BP231 | BP232 | BP233 | BP234 | BP235 | BP236 | BP237 | BP238 |
| | 4 | BP241 | BP242 | BP243 | BP244 | BP245 | BP246 | BP247 | BP248 |
| | 5 | BP251 | BP252 | BP253 | BP254 | BP255 | BP256 | BP257 | BP258 |
| | 6 | BP261 | BP262 | BP263 | BP264 | BP265 | BP266 | BP267 | BP268 |
| | 7 | BP271 | BP272 | BP273 | BP274 | BP275 | BP276 | BP277 | BP278 |
| | 8 | BP281 | BP282 | BP283 | BP284 | BP285 | BP286 | BP287 | BP288 |

| | | ZOOM POSITION | | | | | | | |
|---|---|---|---|---|---|---|---|---|---|
| | | 1 | 2 | 3 | 4 | 5 | 6 | 7 | 8 |
| FOCUS POSITION | 1 | BP311 | BP312 | BP313 | BP314 | BP315 | BP316 | BP317 | BP318 |
| | 2 | BP321 | BP322 | BP323 | BP324 | BP325 | BP326 | BP327 | BP328 |
| | 3 | BP331 | BP332 | BP333 | BP334 | BP335 | BP336 | BP337 | BP338 |
| | 4 | BP341 | BP342 | BP343 | BP344 | BP345 | BP346 | BP347 | BP348 |
| | 5 | BP351 | BP352 | BP353 | BP354 | BP355 | BP356 | BP357 | BP358 |
| | 6 | BP361 | BP362 | BP363 | BP364 | BP365 | BP366 | BP367 | BP368 |
| | 7 | BP371 | BP372 | BP373 | BP374 | BP375 | BP376 | BP377 | BP378 |
| | 8 | BP381 | BP382 | BP383 | BP384 | BP385 | BP386 | BP387 | BP388 |

CONTROL APPARATUS, CONTROL METHOD, AND NON-TRANSITORY COMPUTER-READABLE STORAGE MEDIUM FOR PERFORMING FOCUS CONTROL

BACKGROUND OF THE INVENTION

Field of the Invention

The present invention relates to a control apparatus which is capable of performing focus control.

Description of the Related Art

Previously, a focus detection method by using a contrast detection method and a phase-difference detection method has been known. The contrast detection method and the phase-difference detection method are focus detection methods often used in a video camera and a digital still camera. Furthermore, a configuration in which focus detection is performed by using an image pickup element as a focus detection sensor has been known. In this focus detection method, a focus detection result may contain an error caused by various aberrations of an optical system, and a method of reducing the error has been proposed.

Japanese Patent No. 5087077 discloses a method of calculating a correction value to correct a focus detection result (focus detection error) depending on an evaluation frequency (evaluation band) of focus detection signals. This focus detection error occurs depending on the evaluation band of the focus detection signals used in performing focus detection. In Japanese Patent No. 5087077, the evaluation band of the focus detection signals is specified as a focus detection error, and the focus detection result is corrected by using the correction value appropriate for the evaluation band.

By the way, the focus detection error originally corresponds to a difference between a focus state in which a user can feel that a captured image is in the best focus state and a focus state obtained from the focus detection result. However, Japanese Patent No. 5087077 does not disclose a focus state of a captured image. Accordingly, in the configuration of Japanese Patent No. 5087077, the focus detection error cannot be sufficiently corrected.

SUMMARY OF THE INVENTION

The present invention provides a control apparatus, a control method, and a non-transitory computer-readable storage medium which are capable of performing highly accurate focus control.

A control apparatus as one aspect of the present invention includes an acquirer configured to acquire first information relating to a peak position of a spatial frequency that an image pickup optical system transmits for each spatial frequency, and a processor configured to calculate second information relating to a first evaluation band used for processing of image pickup signals and a second evaluation band used for processing of focus detection signals, the processor is configured to calculate third information relating to a weighting for each spatial frequency, and calculate correction information of focus detection based on the first, second, and third information.

A control method as another aspect of the present invention includes determining first information relating to a peak position of a spatial frequency that an image pickup optical system transmits for each spatial frequency, calculating second information relating to a first evaluation band used for processing of image pickup signals and a second evaluation band used for processing of focus detection signals, calculating third information relating to a weighting for each spatial frequency, and calculating correction information of focus detection based on the first, second, and third information.

A non-transitory computer-readable storage medium as another aspect of the present invention stores a program which causes a computer to execute a process including determining first information relating to a peak position of a spatial frequency that an image pickup optical system transmits for each spatial frequency, calculating second information relating to a first evaluation band used for processing of image pickup signals and a second evaluation band used for processing of focus detection signals, calculating third information relating to a weighting for each spatial frequency, and calculating correction information of focus detection based on the first, second, and third information.

Further features and aspects of the present invention will become apparent from the following description of exemplary embodiments with reference to the attached drawings.

BRIEF DESCRIPTION OF THE DRAWINGS

FIG. 9 is an example of vertical and horizontal BP correction information in this embodiment.

FIG. 12A is an example of color BP correction information in this embodiment.

FIG. 12B is an example of the color BP correction information in this embodiment.

DESCRIPTION OF THE EMBODIMENTS

Exemplary embodiments of the present invention will be described below with reference to the accompanied drawings.

(Configuration of Image Pickup Apparatus)

Figure 2:
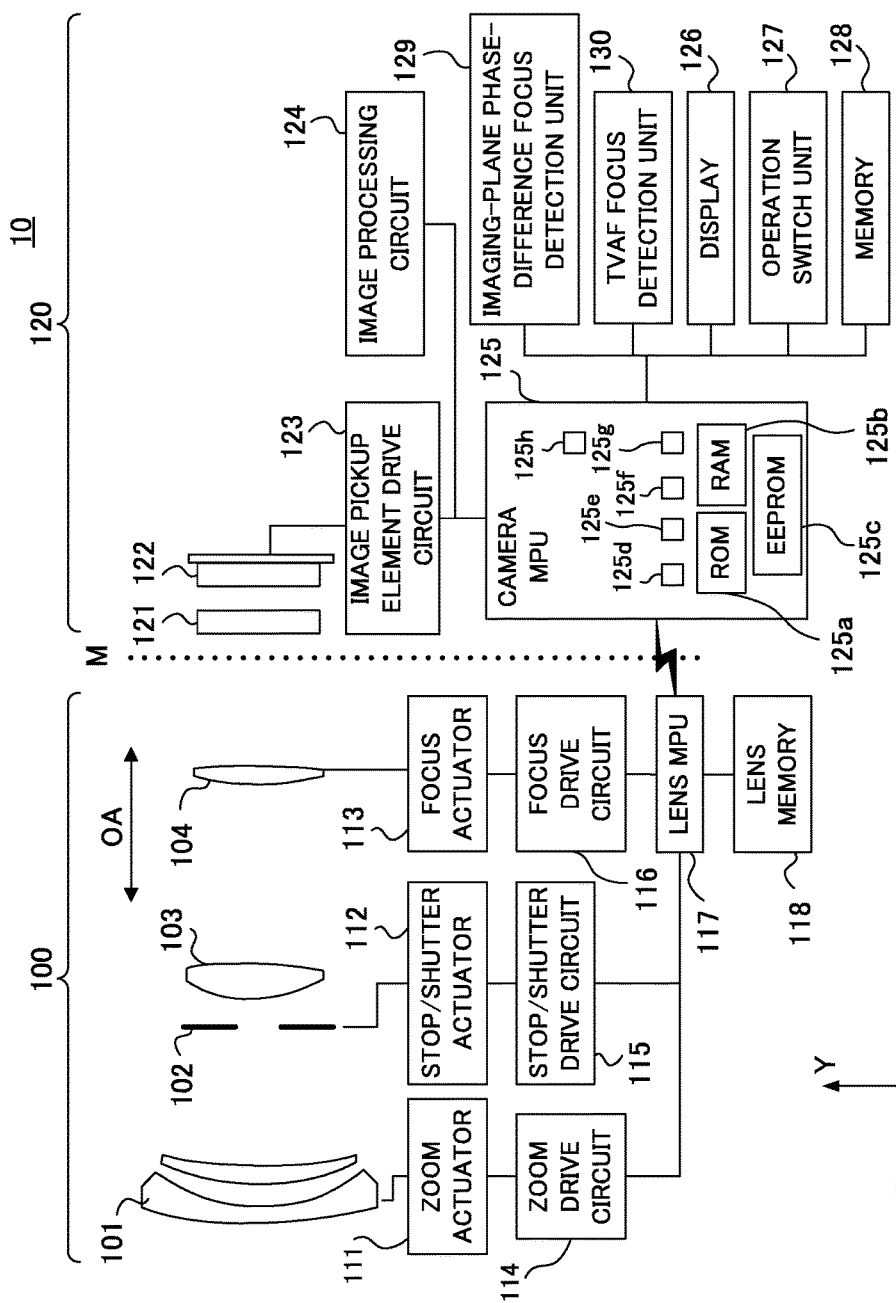
FIG. 2 is a block diagram of an image pickup apparatus in this embodiment.

First of all, referring to FIG. 2, the configuration of an image pickup apparatus in this embodiment will be described. FIG. 2 is a block diagram of an image pickup apparatus 10 (digital single-lens reflex camera including an interchangeable lens) in this embodiment. The image pickup apparatus 10 is a camera system including a lens unit 100 (interchangeable lens) and a camera body 120. The lens unit 100 is removably attached to the camera body 120 via a mount M indicated by a dotted line in FIG. 2. This embodiment, however, is not limited to this, and can be applied also to an image pickup apparatus (digital camera) including a lens unit (image pickup optical system) and a camera body integrated with each other. This embodiment is not limited to the digital camera, and can be applied also to other image pickup apparatuses such as a video camera.

The lens unit 100 includes a first lens unit 101, a stop/shutter 102 (aperture stop with a shutter), a second lens unit 103, a focus lens unit (hereinafter, referred to simply as a focus lens) 104, and a drive/control system. As described above, the lens unit 100 includes an image pickup lens (image pickup optical system) that includes the focus lens 104 and that forms an object image.

The first lens unit 101 is disposed at the front of the lens unit 100 and is held movably forward and backward along an optical axis direction OA. The stop/shutter 102 adjusts its opening diameter to control a light intensity when capturing an image, and it serves as a shutter to control an exposure time when capturing a still image. The stop/shutter 102 and the second lens unit 103 are movable integrally with each other forward and backward in the optical axis direction OA, and they realize a zoom function in conjunction with the back-and-forth motion of the first lens unit 101. The focus lens 104 moves forward and backward in the optical axis direction OA to perform focusing (focus operation).

The drive/control system includes a zoom actuator 111, a stop/shutter actuator 112, a focus actuator 113, a zoom drive circuit 114, a stop/shutter drive circuit 115, a focus drive circuit 116, a lens MPU 117, and a lens memory 118. The zoom actuator 111 drives the first lens unit 101 and the third lens unit 103 forward and backward in the optical axis direction OA to perform zooming. The stop/shutter actuator 112 controls the opening diameter of the stop/shutter 102 to adjust the light intensity and it also controls the exposure time when capturing the still image. The focus actuator 113 moves the focus lens 104 forward and backward in the optical axis direction OA to perform the focusing (focus control). The focus actuator 113 serves as a position detector that detects a current position (lens position) of the focus lens 104. The zoom drive circuit 114 drives the zoom actuator 111 depending on the zooming operation by a user. The stop/shutter drive circuit 115 drives the stop/shutter actuator 112 to control the opening of the stop/shutter 102.

The focus drive circuit 116 performs drive control of the focus actuator 113 based on a focus detection result so that the focus lens 104 moves forward and backward in the optical axis direction OA to perform the focusing. The lens MPU 117 performs all of calculations and controls relating to the image pickup lens, and it controls the zoom drive circuit 114, the stop/shutter drive circuit 115, the focus drive circuit 116, and the lens memory 118. The lens MPU 117 detects the current lens position and notifies a camera MPU 125 of lens position information in response to a request from the camera MPU 125. In this embodiment, the image pickup apparatus 10 includes the camera body 120 including an image pickup unit (image pickup element 122) and the image pickup optical system (lens unit 100) removably mounted on the camera body 120. In this case, the lens unit 100 notifies the image pickup unit of information relating to an imaging position of an object image, for each spatial frequency band, incident on the image pickup element 122 formed via the image pickup optical system. The lens position information contains information such as a position of the focus lens 104 in the optical axis, a position and a diameter of the exit pupil in the optical axis while the image pickup optical system is not moved, and a position and a diameter of a lens frame that restricts a light beam passing through the exit pupil in the optical axis. The lens memory 118 stores optical information needed for autofocusing (AF control).

The camera body 120 includes an optical low-pass filter 121 (optical LPF), the image pickup element 122, and the drive/control system. The optical low-pass filter 121 and the image pickup element 122 serve as the image pickup unit (image pickup device) that photoelectrically converts the object image (optical image) formed via the lens unit 100 to output image data. In this embodiment, the image pickup element 122 photoelectrically converts the object image formed via the image pickup optical system to output, as the image data, each of an image pickup signal and a focus detection signal. In this embodiment, the first lens unit 101, the stop/shutter 102, the second lens unit 103, the focus lens 104, and the optical low-pass filter 121 constitute the image pickup optical system.

The optical low-pass filter 121 reduces a false color and a moire in the captured image. The image pickup element 122 includes a CMOS sensor and its peripheral circuit, and in the image pickup element 122, m pixels and n pixels are arranged in horizontal and vertical directions, respectively. The image pickup element 122 constitutes part of a focus detection apparatus, and it performs autofocusing (AF) by a phase-difference detection method. Image data for focus detection of the image data (image signal) output from the image pickup element 122 are converted into focus detection image data as a focus detection signal by an image processing circuit 124. Image data (image signal) to be used for display, record, or TVAF (AF by a contrast detection method) of the image data output from the image pickup element 122 are also sent to the image processing circuit 124, and predetermined processing is to be performed depending on a purpose.

The drive/control system includes an image pickup element drive circuit 123, the image processing circuit 124, the camera MPU 125, a display 126, an operation switch unit 127 (operation SW), a memory 128, an imaging-plane phase-difference focus detection unit 129, and a TVAF focus detection unit 130. The image pickup element drive circuit 123 controls an operation of the image pickup element 122, and it performs an A/D conversion of an image signal output from the image pickup element 122 to send it to the camera MPU 125. The image processing circuit 124 performs a γ (gamma) conversion, a color interpolation, a JPEG compression, and the like, for the image signal output from the image pickup element 122.

The camera MPU 125 (control apparatus) performs all calculations and controls relating to the camera body 120. In other words, the camera MPU 125 controls the image pickup element drive circuit 123, the image processing circuit 124, the display 126, the operation switch unit 127, the memory 128, the imaging-plane phase-difference focus detection unit 129, and the TVAF focus detection unit 130. The camera MPU 125 is connected to the lens MPU 117 via a signal line at the mount M, issues a request for acquiring a lens position and a request for driving the lens by a predetermined drive amount to the lens MPU 117, and acquires optical information unique to the lens unit 100 from the lens MPU 117. The camera MPU 125 includes a ROM 125a that stores a program to control the operation of the camera body 120, a RAM 125b that stores variables, and an EEPROM 125c that stores various parameters. The camera MPU 125 performs focus detection based on the program stored in the ROM 125a. In the focus detection, known correlation calculation processing is performed by using a pair of image signals which are obtained by photoelectrically converting optical images formed by light beams passing through different regions (divided pupil regions) in a pupil. In the imaging-plane phase-difference AF, the camera MPU 125 performs correction since the influence of the vignetting is large and the reliability of the AF is decreased when an image height of a focus detection position is high. In this embodiment, the camera MPU 125 includes an acquisition unit 125d (acquirer), a determination unit 125e (determiner), a setting unit 125f (setter), a calculation unit 125g (calculator), and a focus control unit 125h (focus controller). The operation of each of these units will be described below. Alternatively, at least part of the units in the camera MPU 125 described above may be provided in the imaging-plane phase-difference focus detection unit 129 or the TVAF focus detection unit 130. The functions corresponding to the units described above can also be performed by a common unit.

The display 126 includes an LCD or the like, and it displays information relating to an image capturing mode of the image pickup apparatus 10, a preview image before capturing an image, a confirmation image after capturing the image, an in-focus state displaying image while performing the focus detection, and the like. The operation switch unit 127 includes a power switch, a release (image capturing trigger) switch, a zoom operation switch, an imaging mode selecting switch, and the like. The memory 128 (recording unit) is a removable flash memory, which records the captured image.

The imaging-plane phase-difference focus detection unit 129 performs the focus detection by autofocusing (AF) of a phase-difference detection method based on image signals of focus detection image data obtained from the image pickup element 122 and the image processing circuit 124. More specifically, the imaging-plane phase-difference focus detection unit 129 performs the imaging-plane phase-difference AF based on an image shift amount of the pair of image signals formed on focus detection pixels by the light beams passing through the pair of pupil regions (divided pupil regions) of the image pickup optical system. The detail of a method of the imaging-plane phase-difference AF will be described below.

The TVAF focus detection unit 130 calculates various TVAF evaluation values based on a contrast component of image information obtained by the image processing circuit 124 to perform focus detection by a contrast method. When performing the focus detection by the contrast method, a focus lens position where the focus evaluation value is peaked (maximized) is detected while the focus lens 104 is being moved.

As described above, the image pickup apparatus of this embodiment is capable of combining the imaging-plane phase-difference AF and the TVAF to perform the focus detection, and it may use one of the imaging-plane phase-difference AF and the TVAF selectively or use both of them in combination depending on the situation. The imaging-plane phase-difference focus detection unit 129 and the TVAF focus detection unit 130 serve as a focus control unit that controls a position of the focus lens 104 by using each of the focus detection results.

(Focus Detection Apparatus)

Next, a focus detection apparatus (control apparatus) using a signal output from the image pickup element 122 will be described. The focus detection apparatus of this embodiment includes, for example, the image pickup element 122, the camera MPU 125, the imaging-plane phase-difference focus detection unit 129, the TVAF focus detection unit 130, and the like, and it is capable of performing the AF by the phase-difference detection method and the AF by the contrast detection method.

(AF by Phase-Difference Detection Method)

Figure 3:
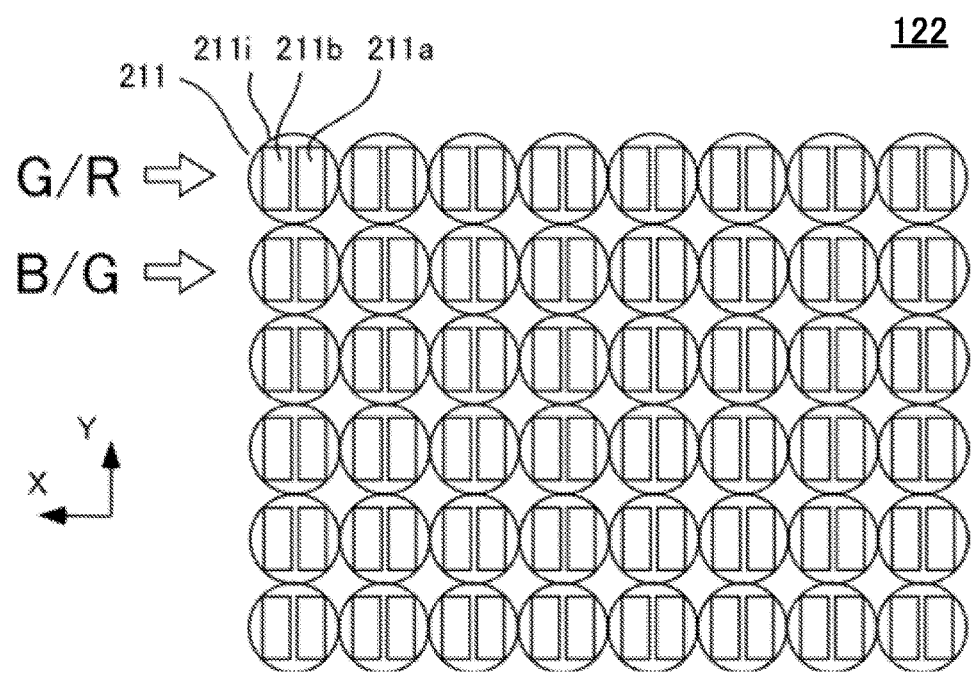
FIG. 3 is a pixel array diagram of an image pickup element in this embodiment.

First, referring to FIGS. 3 to 5A and 5B, the AF by the phase-difference detection method will be described. FIG. 3 is a pixel array diagram of the image pickup element 122 in this embodiment, and it illustrates a range of six rows vertically (in a Y direction) and eight columns horizontally (in an X direction) of a two-dimensional C-MOS area sensor when viewed from the image pickup optical system. A Bayer array is applied to the color filters, and pixels at odd rows are provided with green and red color filters alternately in order from the left side. Pixels at even rows are provided with blue and green color filters alternately in order from the left side. A circle 211i is an on-chip microlens. A plurality of rectangles disposed inside the on-chip microlens 211i are photoelectric conversion portions 211a and 211b.

In this embodiment, all the pixels 211 are divided into two pixels of the photoelectric conversion portions 211a and 211b in the X direction. A photoelectric conversion signal of one of the divided photoelectric conversion portions (one of the photoelectric conversion portions 211a and 211b) and a sum of two photoelectric conversion signals are readable independently. Subtracting the photoelectric conversion signal of the one divided photoelectric conversion portion (for example, the photoelectric conversion portion 211a) from the sum of the two photoelectric conversion signals, a signal corresponding to a photoelectric conversion signal obtained by the other photoelectric conversion portion (for example, the photoelectric conversion portion 211b) can be obtained. The photoelectric conversion signals of the divided photoelectric conversion portions are used for focus detection of a phase-difference method as described below, and can also generate a 3D (three-dimensional) image which is constituted by a plurality of images having parallax information. On the other hand, the sum of the two photoelectric conversion signals is used for a normal captured image.

Hereinafter, a pixel signal by which the focus detection is performed by the phase-difference method will be described. As described below, in this embodiment, a pupil division is performed for an emitted light beam of the image pickup optical system by using the microlens 211i and the divided photoelectric conversion portions 211a and 211b illustrated in FIG. 3. Outputs of the photoelectric conversion portions 211a in the plurality of pixels 211 disposed on the same row within a predetermined range are combined to organize an A image for the AF. Similarly, outputs of the photoelectric conversion portions 211b are combined to organize a B image for the AF. Signal addition processing is performed on outputs of green, red, and blue color signals of the Bayer array to obtain the outputs of the photoelectric conversion portions 211a and 211b which are artificially calculated as luminance (Y) signals. If needed, the A image and B image for the AF can be organized for each of the red, blue, and green colors. Detecting a relative image shift amount between the A image and B image for the AF generated as described above by using correlation calculation, a focus shift amount, i.e., defocus amount, in a predetermined region can be detected.

In this embodiment, one of the A image and B image for the AF is not output from the image pickup element 122, but as described above the sum of the outputs of the A image and B image is output, and therefore the focus detection can be performed by obtaining the other signal based on a difference between the output of the sum and the output of the other one. The image pickup element 122 of this embodiment can be manufactured by using a technology disclosed in, for example, Japanese Patent Laid-open No. 2004-134867, and accordingly descriptions with respect to its detailed structure are omitted.

(Configuration of Readout Circuit)

Figure 4:
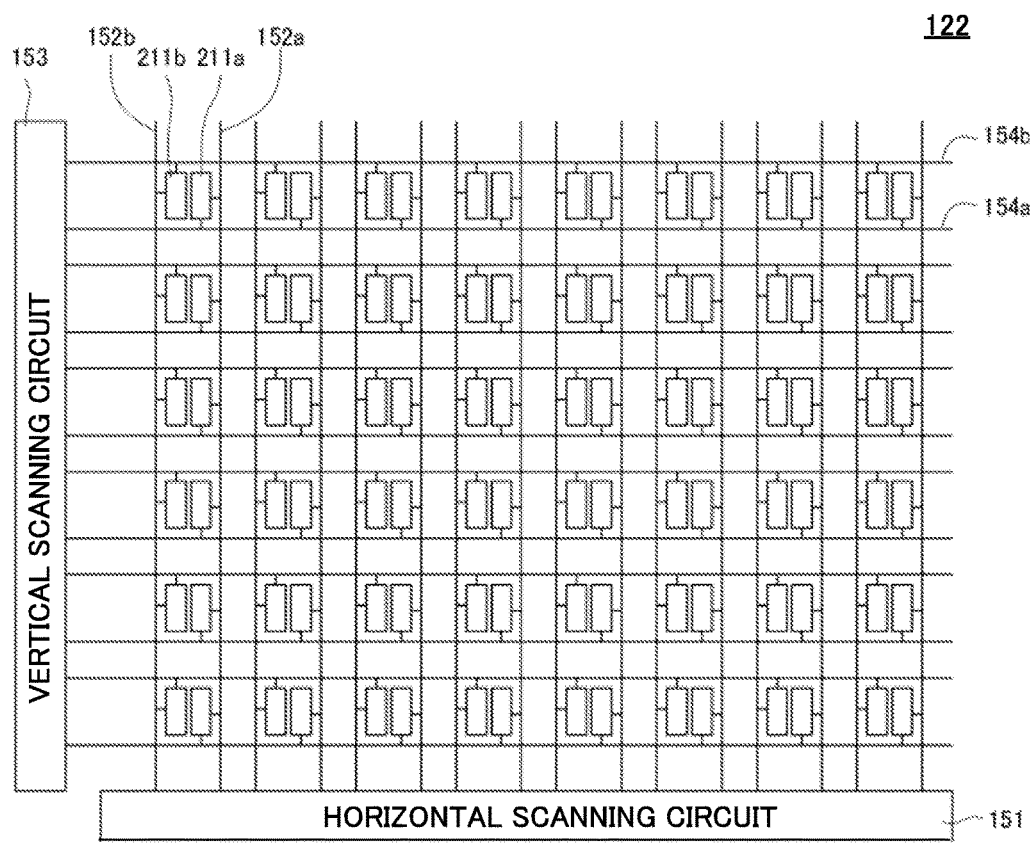
FIG. 4 is a configuration diagram of a readout circuit of the image pickup element in this embodiment.

FIG. 4 is a configuration diagram of a readout circuit of the image pickup element 122 in this embodiment. In FIG. 4, reference numeral 151 denotes a horizontal scanning circuit, and reference numeral 153 denotes a vertical scanning circuit. At a boundary of each pixel, horizontal scanning lines 152a and 152b and vertical scanning lines 154a and 154b are wired, and signals from each of the photoelectric conversion portions 211a and 211b are read out to the outside via these scanning lines.

The image pickup element 122 of this embodiment has the following two types of readout modes (first readout mode and second readout mode). The first readout mode is called an all-pixel readout mode, and it is a mode to capture a high-definition still image. On the other hand, the second readout mode is called a thinning readout mode, and it is a mode only to record a moving image or display a preview image. In the second readout mode, the number of necessary pixels is smaller than the number of all pixels, and accordingly only pixels thinned from all the pixels with a predetermined rate both in the X and Y directions are read out. The thinning readout mode is similarly used when it is necessary to perform high speed readout. When thinning the pixels in the X direction, signal addition processing is performed to improve an S/N ratio. When thinning the pixels in the Y direction, outputs of signals at rows to be thinned are ignored. The focus detection by each of the phase-difference detection method and the contrast detection method is typically performed by the second readout mode.

(Explanation of Conjugate Relation)

Figure 5A:
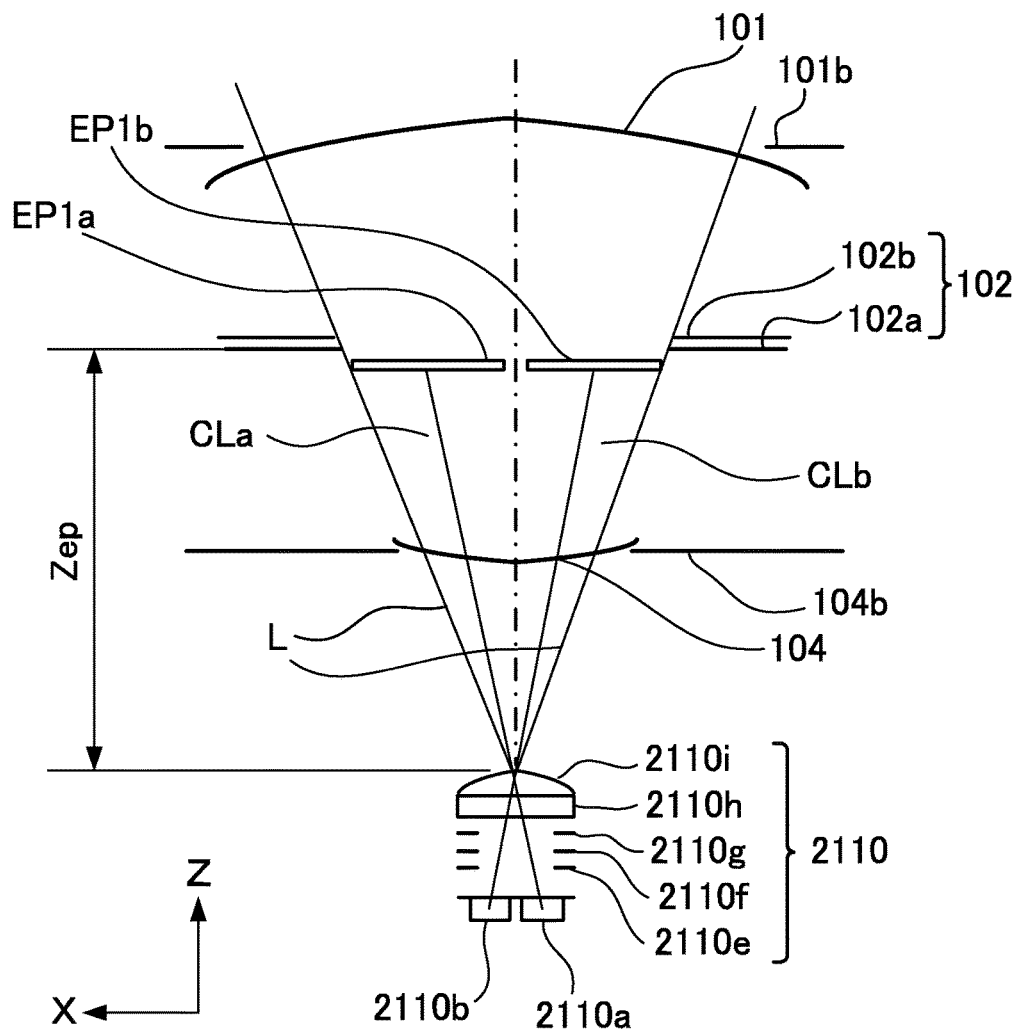
FIGS. 5A and 5B are explanatory diagrams of a conjugate relation between an exit pupil plane of an image pickup optical system and a photoelectric conversion portion of the image pickup element disposed near a center of an image plane in this embodiment.
Figure 5B:
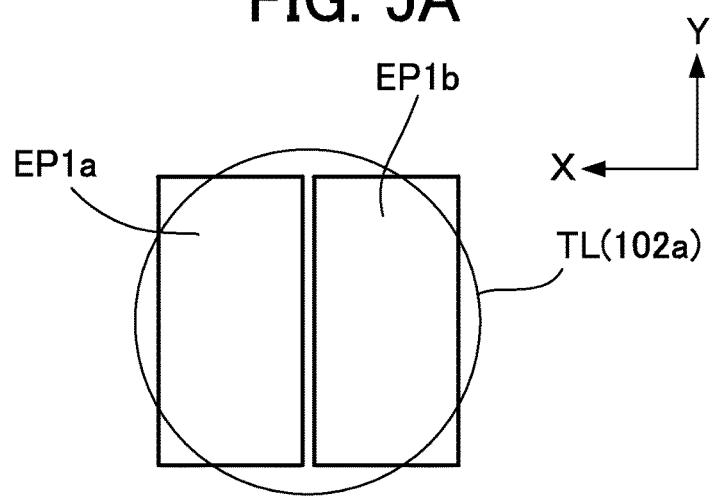

FIGS. 5A and 5B are diagrams of explaining a conjugate relation between exit pupil planes of the image pickup optical system and photoelectric conversion portions of the image pickup element 122 disposed at an image height of zero, that is, disposed near the center of an image plane in the image pickup apparatus 10 of this embodiment. The photoelectric conversion portion in the image pickup element 122 and the exit pupil plane of the image pickup optical system are designed to be in a conjugate relation via the on-chip microlens. Typically, the exit pupil of the image pickup optical system approximately coincides with a plane on which an iris diaphragm for adjusting a light intensity is disposed.

On the other hand, the image pickup optical system in this embodiment is a zoom lens having a magnification varying function (zooming function), and a distance from an imaging plane or a size of the exit pupil may vary depending on its optical type in zooming. The image pickup optical system in FIGS. 5A and 5B illustrate a state in which a focal length is between a wide-angle end and a telephoto end, that is, a middle state. Assuming that this is a standard exit pupil distance Zep, a shape of the on-chip microlens and a decentering parameter depending on an image height (X and Y coordinates) are optimally designed.

In FIG. 5A, reference numeral 101 denotes the first lens unit, reference numeral 101b denotes a barrel member which holds the first lens unit 101, and reference numeral 104b denotes a barrel member which holds the focus lens 104. Reference numeral 102 denotes the stop/shutter (aperture stop), reference numeral 102a denotes an opening plate that determines an opening diameter when opening the stop/shutter 102, and reference numeral 102b denotes a stop blade to adjust the opening diameter when closing the stop/shutter 102. The barrel member 101b that operates as a limiting member of a light beam passing through the image pickup optical system, the opening plate 102a, the stop blade 102b, and the barrel member 104b indicate an optical virtual image when viewed from the image plane. A synthesized opening near the stop/shutter 102 is defined as an exit pupil of a lens, and a distance from the image plane to the exit pupil is denoted by Zep as described above.

Reference numeral 2110 denotes a pixel that photoelectrically converts an object image, and it is disposed near the center of the image plane. In this embodiment, the pixel 2110 is called a center pixel. The center pixel 2110 includes, in order from the lowest layer, each member of photoelectric conversion portions 2110a and 2110b, wiring layers 2110e to 2110g, a color filter 2110h, and an on-chip microlens 2110i. The two photoelectric conversion portions 2110a and 2110b are projected on the exit pupil planes of the image pickup optical system by the on-chip microlens 2110i. In other words, the exit pupil (projection images EP1a and EP1b) of the image pickup optical system are projected on surfaces of the photoelectric conversion portions 2110a and 2110b via the on-chip microlens 2110i.

FIG. 5B illustrates projection images of the photoelectric conversion portions on the exit pupil plane of the image pickup optical system, and the projection images for the photoelectric conversion portions 2110a and 2110b are denoted by EP1a and EP1b, respectively. In this embodiment, the image pickup element 122 includes pixels which are capable of obtaining an output of one of the two photoelectric conversion portions 2110a and 2110b and an output of the sum of them. The output of the sum of them is a signal output by photoelectrically converting the light beam passing through both regions of the projection images EP1a and EP1b which are an approximately entire pupil region.

In FIG. 5A, when (outermost of) the light beam passing through the image pickup optical system is denoted by L, the light beam L is limited by the opening plate 102a of the stop/shutter 102, and with respect to the projection images EP1a and EP1b, the vignetting does not substantially occur in the image pickup optical system. In FIG. 5B, the light beam L in FIG. 5A is indicated as TL. Most of the projection images EP1a and EP1b of the photoelectric conversion portions 2110a and 2110b are included in the circle indicated by TL, and thus the vignetting does not substantially occur. The light beam L is limited only by the opening plate 102a of the stop, and accordingly TL can be restated as the opening plate 102a. In this case, the vignetting state of each of the projection images EP1a and EP1b is symmetric with respect to an optical axis at the center of the image plane, and the light intensities to be received by the photoelectric conversion portions 2110a and 2110b are equal to each other.

As described with reference to FIGS. 3 to 5A and 5B, the image pickup element 122 has a function as a focus detection apparatus, as well as a function of capturing an image. As a focus detection method, the AF by the phase-difference detection method can be performed since the image pickup element 122 includes focus detection pixels that receive light beams obtained by dividing the exit pupil. While the configuration in which the exit pupil is divided in the horizontal direction is described in this embodiment, pixels which divide the exit pupil in the vertical direction can also be provided on the image pickup element 122. Providing pixels which divide the exit pupil in both directions, the focus detection which supports the contrast of an object in the vertical direction, as well as the horizontal direction, can be performed.

(AF by Contrast Detection Method)

Figure 6:
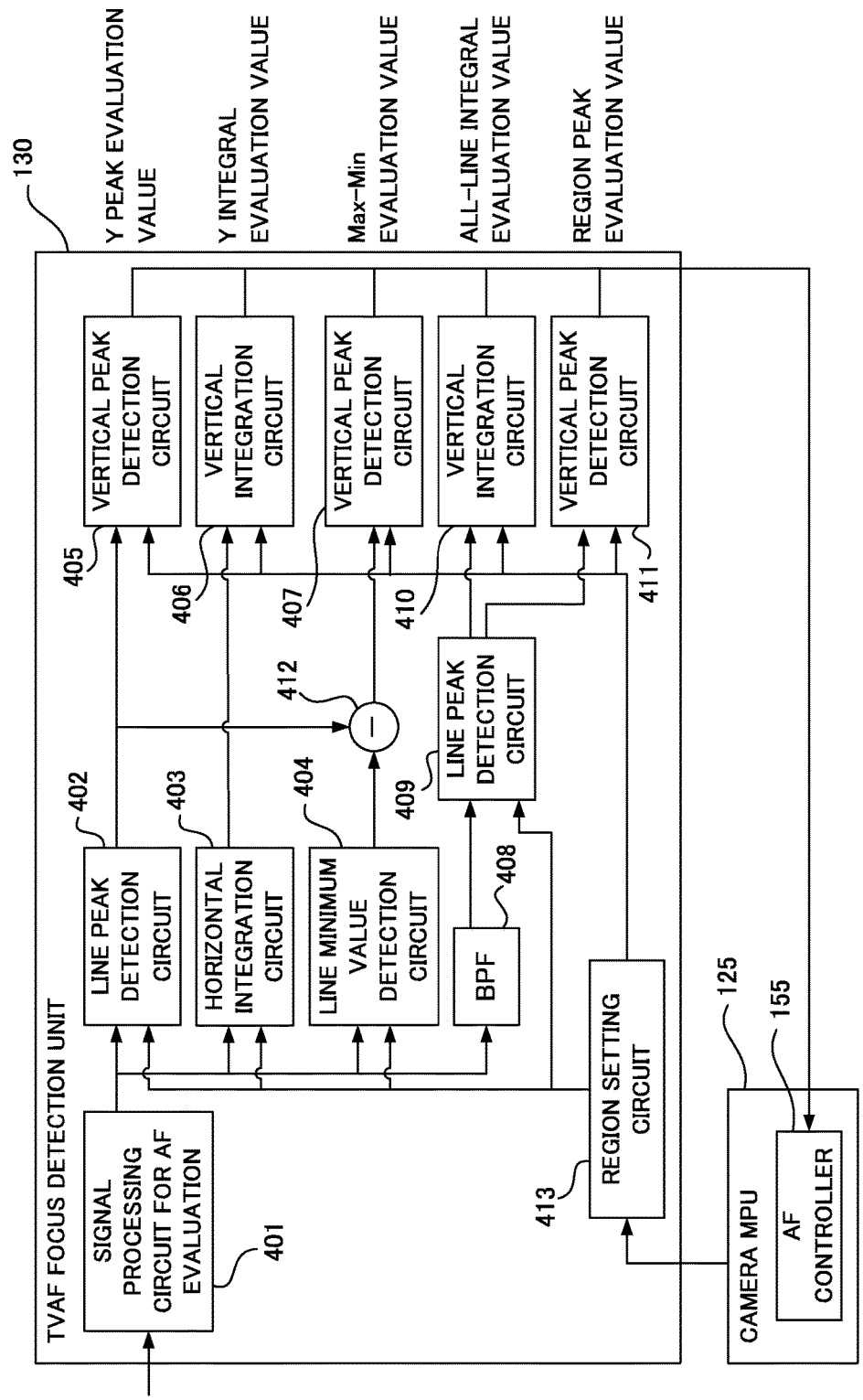
FIG. 6 is a block diagram of a camera MPU and a TVAF focus detection unit in this embodiment.

Next, referring to FIG. 6, the AF by the contrast detection method will be described. FIG. 6 is a block diagram of the camera MPU 125 and the TVAF focus detection unit 130, and illustrates a flow of calculating various AF evaluation values calculated by using the camera MPU 125 and the TVAF focus detection unit 130 in FIG. 2.

The image pickup element drive circuit 123 includes an A/D conversion circuit, and a digital signal converted by the A/D conversion circuit is input to the TVAF focus detection unit 130. In this case, an AF evaluation signal processing circuit 401 extracts green (G) signals from Bayer array signals, and performs gamma correction processing to emphasize a low luminance component and suppress a high luminance component. In this embodiment, a case in which the TVAF focus detection is performed by using the green (G) signals is described, but all of red (R), blue (B), and green (G) signals may be used. Furthermore, a luminance (Y) signal can be generated by using all colors of RGB. Hereinafter, the output signal generated by the AF evaluation signal processing circuit 401 is called a luminance signal Y, regardless of used colors.

Subsequently, a method of calculating a Y peak evaluation value will be described. The luminance signal Y on which the gamma correction has been performed is input to a line peak detection circuit 402 to detect a line peak value for each horizontal line. The line peak detection circuit 402 calculates (detects) a Y line peak value for each horizontal line within an AF evaluation range set by a region setting circuit 413. An output of the line peak detection circuit 402 is input to a vertical peak detection circuit 405. The vertical peak detection circuit 405 holds a peak (performs peak hold) in the vertical direction within the AF evaluation range set by the region setting circuit 413, and it generates the Y peak evaluation value. The Y peak evaluation value is effective for determining a high luminance object or a low illuminance object.

Subsequently, a method of calculating a Y integral evaluation value will be described. The luminance signal Y on which the gamma correction has been performed is input to a horizontal integration circuit 403 to detect an integral value for each horizontal line. The horizontal integration circuit 403 obtains an integral value of the luminance signal Y for each horizontal line within the AF evaluation range set by the region setting circuit 413. An output of the horizontal integration circuit 403 is input to a vertical integration circuit 406. The vertical integration circuit 406 perform integration in the vertical direction within the AF evaluation range set by the region setting circuit 413, and it generates the Y integral evaluation value. The Y integral evaluation value is effective for determining the brightness within an entire AF evaluation range.

Subsequently, a method of calculating a Max-Min evaluation value will be described. The luminance signal Y on which the gamma correction has been performed is input to the line peak detection circuit 402, which obtains the Y line peak value for each horizontal line within the AF evaluation range. The luminance signal Y on which the gamma correction has been performed is input to a line minimum value detection circuit 404. The line minimum value detection circuit 404 detects a minimum value of the luminance signal Y for each horizontal line within the AF evaluation range of the luminance signal Y. The detected line peak value and minimum value of the luminance signal Y for each horizontal line are input to a subtractor 412, which performs calculation, i.e., subtracts the minimum value from the line peak value, and inputs the calculation result to a vertical peak detection circuit 407. The vertical peak detection circuit 407 holds a peak (performs peak hold) in the vertical direction within the AF evaluation range, and generates the Max-Min evaluation value. The Max-Min evaluation value is effective for determining a low contrast or a high contrast.

Subsequently, a method of calculating a region peak evaluation value will be described. The luminance signal Y on which the gamma correction has been performed passes through a BPF 408 (Band-Pass Filter). As a result, a focus signal that is obtained by extracting a specific frequency component is generated. This focus signal is input to a line peak detection circuit 409 as a peak hold unit to detect a line peak value for each horizontal line. The line peak detection circuit 409 calculates (detects) the line peak value for each horizontal line within the AF evaluation range. The calculated line peak value is output to a vertical peak detection circuit 411. The vertical peak detection circuit 411 hold a peak (performs peak hold) within the AF evaluation range, and generates the region peak evaluation value. Since an amount of change of the region peak evaluation value is small even when an object moves within the AF evaluation range, the region peak evaluation value is effective for determining restart to move to processing of searching an in-focus point from an in-focus state again.

Subsequently, a method of calculating an all-line integral evaluation value will be described. Similarly to the case of the region peak evaluation value, the line peak detection circuit 409 calculates (detects) the line peak value for each horizontal line within the AF evaluation region. The calculated line peak value is input to a vertical integration circuit 410. The vertical integration circuit 410 integrates the line peak values for the number of all horizontal scanning lines in the vertical direction within the AF evaluation range, and generates the all-line integral evaluation value. Since the all-line integral evaluation value (high-frequency all-line integral evaluation value) has a wide dynamic range and a high sensitivity as a result of the integration, it is effective as a main evaluation value of the AF for detecting an in-focus position. In this embodiment, the all-line integral evaluation value to be used for focusing, which changes depending on a defocus state, is called a focus evaluation value.

The region setting circuit 413 generates a gate signal for the AF evaluation range to select a signal located at a predetermined position in a screen set by the camera MPU 125. The gate signal is input to each circuit of the line peak detection circuit 402, the horizontal integration circuit 403, the line minimum value detection circuit 404, the line peak detection circuit 409, the vertical integration circuits 406 and 410, and the vertical peak detection circuits 405, 407, and 411. In this case, the camera MPU 125 (region setting circuit 413) controls an input timing of the luminance signal Y to each circuit so that each focus evaluation value is generated by the luminance signal Y within the AF evaluation range. Furthermore, the region setting circuit 413 is capable of setting a plurality of regions in accordance with the AF evaluation range.

An AF control unit 155 of the camera MPU 125 takes in each focus evaluation value, controls the focus actuator 113 via the focus drive circuit 116, and moves the focus lens 104 in the optical axis direction GA to perform AF control. In this embodiment, various AF evaluation values are calculated in the vertical line direction, in addition to the horizontal line direction as described above. As a result, the focus detection can be performed for contrast information of an object in both of horizontal and vertical directions. When performing the AF by the contrast detection method, the TVAF focus detection unit 130 calculates various AF evaluation value described above while the camera MPU 125 drives the focus lens 104. The TVAF focus detection unit 130 performs the focus detection by detecting a focus lens position where the all-line integral evaluation value is maximized.

(Focus Detection Region)

Figure 7:
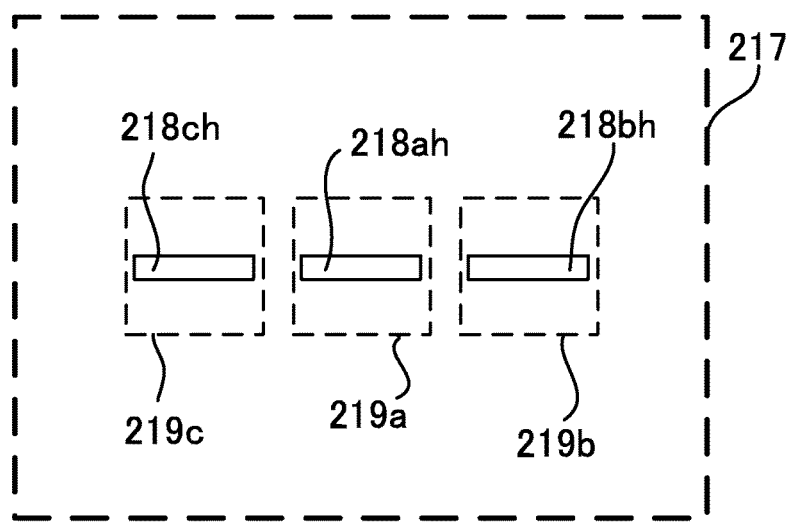
FIG. 7 is a diagram of illustrating a focus detection region within an image capturing range in this embodiment.

Next, referring to FIG. 7, a focus detection region in this embodiment will be described. FIG. 7 is a diagram of illustrating the focus detection region within an image capturing range. In this embodiment, the imaging-plane phase-difference AF (AF by the phase-difference detection method) and the TVAF (AF by the contrast detection method) are performed based on signals obtained from the image pickup element 122 within the focus detection region. The focus detection region illustrated in FIG. 7 includes a focus detection unit including pixels which perform the pupil division in the horizontal direction (lateral direction) of the image pickup element 122 (image pickup lens) illustrated in FIG. 3.

Rectangles indicated by dashed lines in FIG. 7 are an image capturing range 217 in which pixels of the image pickup element 122 are formed. Three focal detection regions 218*ah*, 218*bh*, and 218*ch* in the lateral direction are provided in the image capturing range 217. In this embodiment, as illustrated in FIG. 7, as focus detection regions in which the AF by the phase-difference detection method is to be performed, a total of three focus detection regions 218*ah*, 218*bh*, and 218*ch* are provided at the center, and the right and left sides, respectively, in the image capturing range 217.

Furthermore, in this embodiment, as illustrated in FIG. 7, focus detection regions 219*a*, 219*b*, and 219*c* in which the TVAF (AF by the contrast detection method) is to be performed are provided so as to include each of the three focus detection regions in which the imaging-plane phase-difference AF is to be performed. In the focus detection regions 219*a*, 219*b*, and 219*c* for performing the TVAF, the focus detection by the contrast method is performed by using the focus evaluation value relating to each of the horizontal direction and vertical direction described referring to FIG. 6. While the focus detection regions are roughly disposed at three positions in the example illustrated in FIG. 7, this embodiment is not limited to this and a plurality of regions may be disposed at arbitrary positions.

(Focus Detection)

Figure 1A:
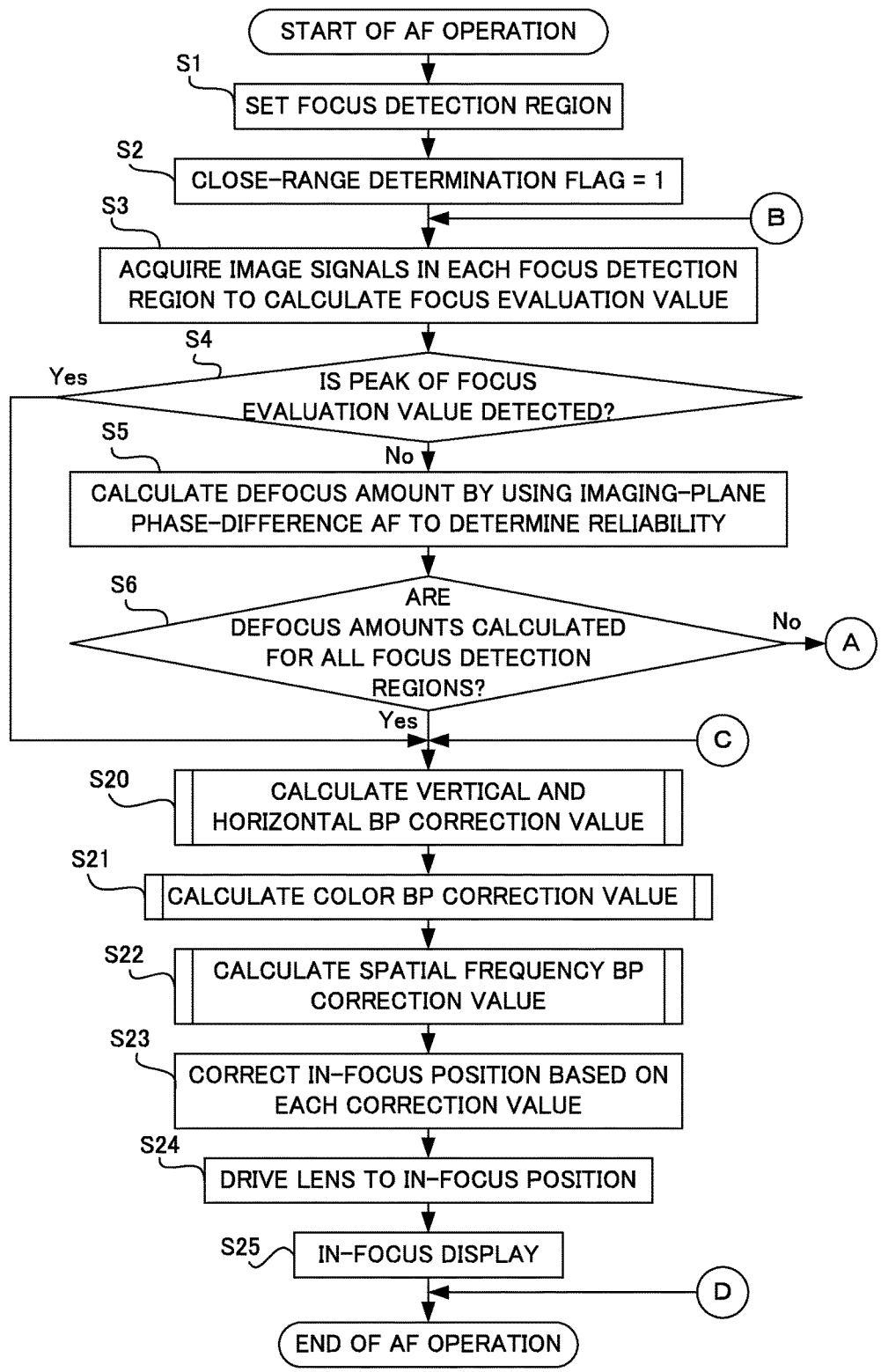
FIG. 1A is a flowchart of a process of focus detection in this embodiment.
Figure 1B:
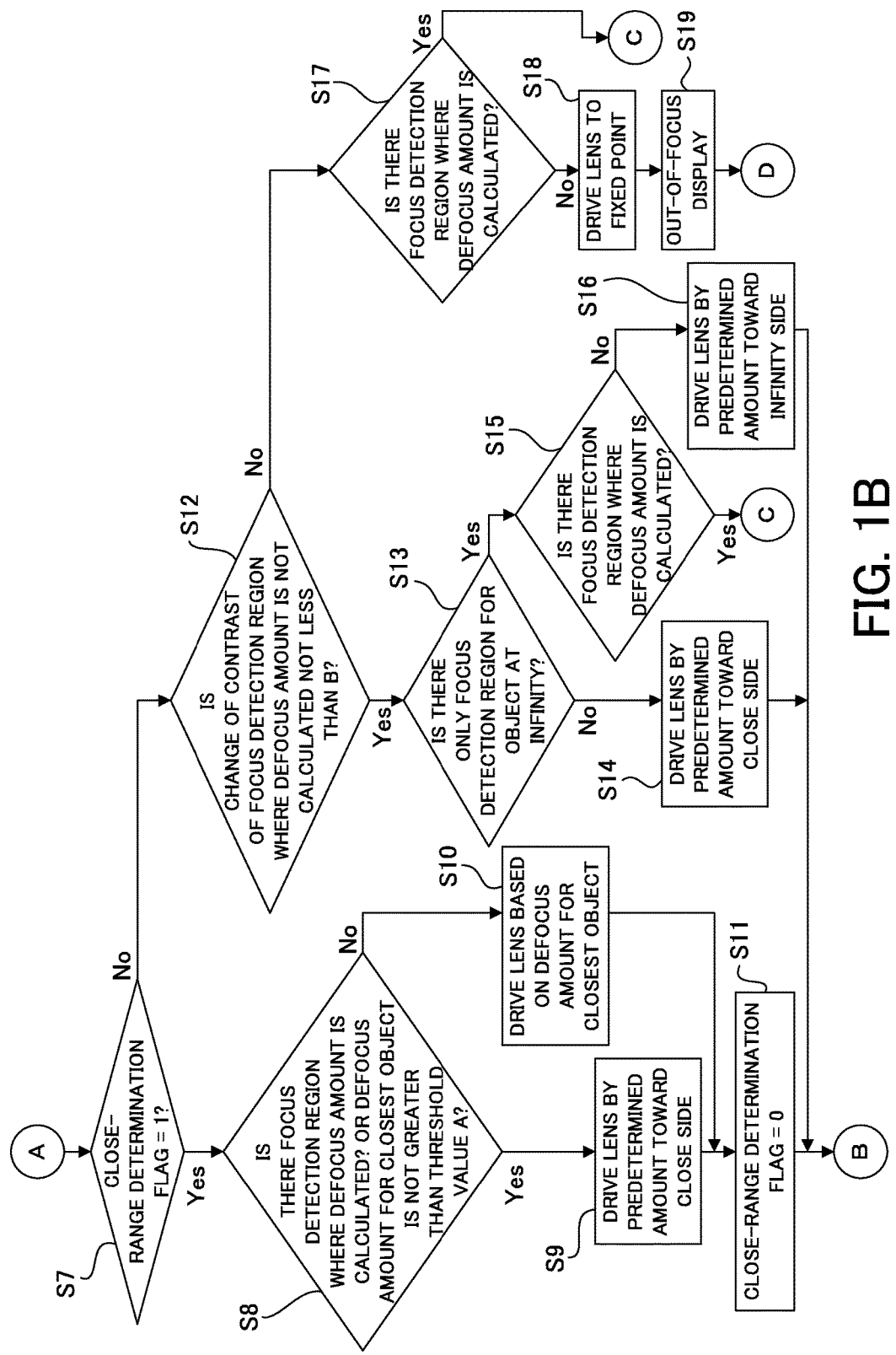
FIG. 1B is a flowchart of the process of the focus detection in this embodiment.

Next, referring to FIGS. 1A and 1B, the focus detection (AF operation) in this embodiment will be described. FIGS. 1A and 1B are flowcharts of the focus detection. Each step in FIGS. 1A and 1B is performed mainly by the camera MPU 125, or the imaging-plane phase-difference focus detection unit 129 or the TVAF focus detection unit 130 based on an instruction (command) from the camera MPU 125.

In the focus detection in this embodiment, first, for each of the focus detection regions 218*ah*, 218*bh*, and 218*ch*, the camera MPU 125 obtains a focus shift amount (defocus amount) and a reliability. Then, the camera MPU 125 separates the regions into a region where a defocus amount having a predetermined reliability is obtained and a region where the defocus amount having the predetermined reliability is not obtained. When the defocus amount having the predetermined reliability is obtained in all the focus detection regions 218*ah*, 218*bh*, and 218*ch*, the camera MPU 125 drives the focus lens 104 to focus on a closest object.

On the other hand, when there is a region in which the defocus amount having the predetermined reliability is not obtained, the camera MPU 125 determines whether there is a closer object by using an amount of change of the focus evaluation value before and after driving the focus lens for the respective region of the focus detection regions 219*a* to 219*c*. Then, when it is determined that there is the closer object, the camera MPU 125 drives the focus lens 104 based on the change of the focus evaluation value. If the focus evaluation value is not previously obtained, the camera MPU 125 cannot obtain the amount of change of the focus evaluation value. In this case, when there is a region in which the defocus amount having the predetermined reliability, which is larger than a predetermined defocus amount, is obtained, the camera MPU 125 drives the focus lens 104 so as to focus on the closest object.

In other cases, that is, when there is no region in which the defocus amount having the predetermined reliability is obtained, or when the obtained defocus amount is not greater than a predetermined defocus amount, the camera MPU 125 performs the lens drive with a predetermined amount which is not relevant to the defocus amount. The reason why the lens drive with the predetermined amount which is not relevant to the defocus amount when the defocus amount is small is that there is a high probability that it is difficult to detect the change of the focus evaluation value in the next focus detection. When the focus detection is completed by using any methods, the camera MPU 125 calculates various correction values to correct the focus detection result. The camera MPU 125 drives the focus lens 104 based on the corrected focus detection result, and accordingly the focusing operation (AF operation) is finished.

Hereinafter, referring to FIGS. 1A and 1B, the AF operation described above will be described in detail. FIGS. 1A and 1B are flowcharts of illustrating a procedure of the AF operation of the image pickup apparatus 10. A control program relating to the AF operation is executed by the camera MPU 125. When the camera MPU 125 starts the AF operation, first at step S1, it sets a focus detection region to perform focusing on an object. At step S1, for example, three focus detection regions are set as illustrated in FIG. 7.

Subsequently, at step S2, the camera MPU 125 sets a close-range determination flag to 1. Then, at step S3, the camera MPU 125 (imaging-plane phase-difference detection unit 129) acquires, for each focus detection region, a signal necessary for the focus detection. Specifically, after the image pickup element 122 performs an exposure, the imaging-plane phase-difference focus detection unit 129 acquires image signals of focus detection pixels included in the focus detection regions 218*ah*, 218*bh*, and 218*ch* for the imaging-plane phase-difference AF. In this embodiment, correction processing disclosed in Japanese Patent Laid-open No. 2010-117679 may be performed on the acquired image signals. Furthermore, after the image pickup element 122 performs the exposure, the camera MPU 125 (TVAF focus detection unit 130) acquires image signals within the focus detection regions 219*a*, 219*b*, and 219*c* to be used for the TVAF to calculate the focus evaluation value. The calculated evaluation value is stored in the RAM 125*b*.

Subsequently, at step S4, the camera MPU 125 determines whether a peak (maximum value) of the focus evaluation value is detected. This is to perform the focus detection by the contrast detection method, and the flow proceeds to step S20 to finish the focus detection when a reliable peak is detected. The reliability of the focus evaluation value is determined by for example a method as disclosed in FIGS. 10 to 13 of Japanese Patent Laid-open No. 2010-078810. In other words, whether the focus evaluation value indicating a focus state has a mountain shape is determined based on a difference between a maximum value and a minimum value of the focus evaluation value, a length of a part inclined at a slope not less than a predetermined value (SlopeThr), and a gradient of the inclined part. As a result, the reliability of the peak can be determined.

In this embodiment, the AF by the contrast detection method is used together with the AF by the phase-difference detection method. Therefore, in a case where it is confirmed that there is a closer object in the same focus detection region or other focus detection regions, the flow may proceed to step S5 without finishing the focus detection even when the reliable peak of the focus evaluation value is detected. In this case, a position of the focus lens 104 corresponding to a position of the peak of the focus evaluation value is stored, and then, the stored position of the focus lens 104 is used as a focus detection result when a reliable focus detection result cannot be obtained.

Subsequently, at step S5, the camera MPU 125 calculates a shift amount of a pair of obtained image signals in each focus detection region for the imaging-plane phase-difference AF to calculate a defocus amount by using a conversion coefficient, which is previously stored, to convert the shift amount into the defocus amount. In this embodiment, the camera MPU 125 determines the reliability of the calculated defocus amount as well, and uses, for the subsequent AF operation, only the defocus amount for the focus detection region which is determined to have a predetermined reliability. As the defocus amount increases due to the influence of the vignetting caused by the image pickup lens, the detected shift amount of the pair of image signals contains a lot of errors. Therefore, when the calculated defocus amount is large, the degree of coincidence of the shape of the pair of image signals is low, or the contrast of the pair of image signals is low, the camera MPU 125 determines that highly-accurate focus detection is impossible, i.e., the reliability of the calculated defocus amount is low. Hereinafter, the expression "defocus amount is calculated" or "defocus amount can be calculated" is used when the calculated defocus amount has the predetermined reliability, and on the other hand, the expression "defocus amount cannot be calculated" is used when the defocus amount cannot be calculated for any reason or the reliability of the calculated defocus amount is low.

Subsequently, at step S6, the camera MPU 125 determines whether the defocus amount can be calculated with respect to all of the plurality of focus detection regions 218*ah*, 218*bh*, and 218*ch* set at step S1. When the defocus amount can be calculated for all the focus detection regions, the flow proceeds to step S20. Then, the camera MPU 125 calculates a vertical and horizontal BP correction value (BP1) for the focus detection region in which the defocus amount indicating the closest object among the calculated defocus amounts is detected. The reason why the closest object is selected is that typically an object to be focused on by a user exists at the close side in many cases. The vertical and horizontal BP correction value (BP1) is used to correct a difference between a focus detection result obtained when the focus detection is performed for the contrast of an object in a horizontal direction and a focus detection result obtained when the focus detection is performed for the contrast of an object in a vertical direction.

Typically, an object has a contrast both in the horizontal direction and the vertical direction, and the focus state of a captured image is evaluated based on the contrasts both in the horizontal direction and the vertical direction. On the other hand, when the focus detection is performed only in the horizontal direction as the AF by the phase-difference detection method described above, an error is generated between the focus detection result in the horizontal direction and the focus state in both direction of the horizontal direction and the vertical direction of the captured image. This error occurs due to astigmatism or the like of the image pickup optical system. The vertical and horizontal BP correction value (BP1) is a correction value to correct the error. The vertical and horizontal BP correction value (BP1) is calculated based on the selected focus detection region, the position of the focus lens 104, the position of the first lens unit 101 indicating a zoom state, and the like. The detail of the calculation method of the vertical and horizontal BP correction value will be described below.

Subsequently, at step S21, the camera MPU 125 calculates a color BP correction value (BP2) by using contrast information in one of the vertical or horizontal direction for the focus detection region for which the correction value is calculated at step S20. The color BP correction value (BP2) is a correction value to correct an error which occurs due to a chromatic aberration of the image pickup optical system, and is generated by a difference between a balance of a color of a signal used for the focus detection and a balance of a color of a signal used for the captured image or the developed image. For example in this embodiment, when the focus detection by the contrast detection method is performed, the focus evaluation value to be used is generated by a pixel output having a green (G) color filter and thus an in-focus position corresponding to a wavelength of a green color is principally detected. On the other hand, since the captured image is generated by using all colors of RGB, a shift (error) from the focus detection result by using the focus evaluation value is generated when an in-focus position corresponding to red (R) or blue (B) color is different from the in-focus position corresponding to green (G) color. The color BP correction value (BP2) is a correction value to correct the error. The detail of the calculation method of the color BP correction value will be described below.

Subsequently, at step S22, the camera MPU 125 calculates a spatial frequency BP correction value (BP3) with respect to a specific color using contrast information of the green or the luminance signal Y in one of the vertical or horizontal direction, for the focus detection region for which the corrections are performed at steps S20 and S21. The spatial frequency BP correction value (BP3) is used to correct an error which principally occurs due to a spherical aberration of the image pickup optical system, and is generated based on a difference between an evaluation frequency (band) of a signal used for the focus detection and an evaluation frequency (band) when viewing the captured image. As described above, when performing the focus detection, a mode of reading output signals from the image pickup element 122 is set to the second readout mode, and accordingly the output signals are added or thinned. Therefore, the evaluation band of the output signals used for the focus detection is lower than that of the captured image generated by using signals from all pixels read in the first readout mode. The spatial frequency BP correction value (BP3) is a correction value to correct the error caused by the difference of the evaluation bands. The detail of the calculation method of the spatial frequency BP correction value (BP3) will be described below.

Subsequently, at step S23, the camera MPU 125 corrects the focus detection result (defocus amount DEF_B) according to the following expression (1) by using the three correction values (BP1, BP2, and BP3) calculated at steps S20, S21, and S22, respectively. As a result, the corrected focus detection result (corrected defocus amount DEF_A) can be calculated.

$$DEF\_A = DEF\_B + BP1 + BP2 + BP3 \quad (1)$$

In this embodiment, the camera MPU 125 calculates the correction values to correct the focus detection result, at three stages, in order from the vertical and horizontal BP correction value, the color BP correction value, and the spatial frequency BP correction value. First, the camera MPU 125 calculates the vertical and horizontal BP correction value (BP1), and thus calculates an error which occurs due to the use of contrast information in any one of directions for the focus detection while it uses contrast information in both of the vertical and horizontal directions for the evaluation in viewing the captured image. Next, the camera MPU 125 separates the influence of the vertical and horizontal BP (best focal point), and calculates, as the color BP correction value (BP2), a difference between in-focus positions due to the color of the signal used when viewing the captured image and when performing the focus detection. Furthermore, the camera MPU 125 calculates, as the spatial frequency BP correction value (BP3), a difference between in-focus positions which occur due to the difference of the evaluation bands when viewing the captured image and when performing the focus detection with respect to a specific color such as a green and a luminance signal in the contrast information in one direction. As described above, the three types of errors are separately calculated, and accordingly a calculation amount and a data capacity to be stored in the lens or the camera can be reduced.

Subsequently, at step S24, the camera MPU 125 (and the lens MPU 117) drives the focus lens 104 based on the corrected defocus amount DEF_A calculated by expression (1) (focus control). Then, at step S25, the camera MPU 125 performs an in-focus display on the display 126 with respect to the focus detection region for which the defocus amount used for the lens drive is calculated, and finishes the AF operation.

On the other hand, when there is a focus detection region for which the defocus amount cannot be calculated at step S6, the flow proceeds to step S7 in FIG. 1B. At step S7, the camera MPU 125 determines whether the close-range determination flag is 1. The close-range determination flag becomes 1 when the lens drive has never been performed, and it becomes 0 when the lens drive has been performed a plurality of times. When the close-range determination flag is 1, the flow proceeds to step S8.

At step S8, the camera MPU 125 determines whether the defocus amount cannot be calculated for all the focus detection regions and whether a defocus amount indicating the existence of the closest object among the calculated defocus amounts is not greater than a predetermined threshold value A. When the defocus amount cannot be calculated for all the focus detection regions or the defocus amount indicating the existence of the closest object among the calculated defocus amounts is not greater than the predetermined threshold value A, the flow proceeds to step S9. At step S9, the camera MPU 125 performs the lens drive by a predetermined amount toward the close side.

A reason why the lens drive by the predetermined amount is performed in the case of "Yes" at step S8 will be described. First, a case in which there is no region for which the defocus amount can be calculated among a plurality of focus detection regions corresponds to a case in which an object to be focused on is not found at this time. Therefore, in order to confirm the existence of the object to be focused on for all the focus detection regions before determining that the focusing is impossible, the lens drive by the predetermined amount is performed to determine change of the focus evaluation value described below.

The casein which the defocus amount indicating the existence of the closest object among the calculated defocus amounts is not greater than the predetermined threshold value A means that there is a focus detection region in an approximately in-focus state at this time. In this situation, in order to confirm the possibility that there is an object which is not detected at this time, the lens drive by the predetermined amount is performed to determine the change of the focus evaluation value described below. In this embodiment, the lens drive amount may be determined according to an F number of the image pickup optical system or a sensitivity of a focus moving amount on an image pickup element plane relative to the lens drive amount.

On the other hand, in the case of "No" at step S8, i.e., when the defocus amount indicating the existence of the closest object among the calculated defocus amounts is greater than the predetermined threshold value A, the flow proceeds to step S10. In this case, there is a focus detection region for which the defocus amount is calculated, but the focus detection region is not in the in-focus state. Accordingly, at step S10, the camera MPU 125 performs the lens drive based on the defocus amount indicating the existence of the closest object among the calculated defocus amounts. After the lens drive is performed at step S9 or S10, the flow proceeds to step S11. At step S11, the camera MPU 125 sets the close-range determination flag to 0, and the flow returns to step S3 in FIG. 1A.

On the other hand, when the close-range determination flag is not 1, that is, the flag is 0, at step S7, the flow proceeds to step S12. At step S12, the camera MPU 125 determines whether the focus evaluation value in the focus detection region for the TVAF corresponding to the focus detection region in which the defocus amount cannot be calculated changes by not less than a predetermined threshold value B before and after the lens drive. In this embodiment, the focus evaluation value may increase or decrease, and in either case, the camera MPU 125 determines whether an absolute value of a change amount of the focus evaluation value is not less than the predetermined threshold value B.

The case in which the absolute value of the change amount of the focus evaluation value is not less than the predetermined threshold value B at step S12 means that change of a blur state of the object can be detected according to the increase or decrease of the focus evaluation value while the defocus amount cannot be calculated. Therefore, in this embodiment, even when the defocus amount cannot be detected by the imaging-plane phase-difference AF, the existence of the object is determined based on the increase or decrease of the focus evaluation value and the AF operation is continued. As a result, the focusing can be performed for the object which is undetectable by using the imaging-plane phase-difference AF because of the large defocus amount. The predetermined threshold value B to be used for the determination changes depending on the previous lens drive amount. When the lens drive amount is large, the threshold value B is set to be a greater value. On the other hand, when the lens drive amount is small, the threshold value B is set to be a smaller value. This is because the change amount of the focus evaluation value increases with the increase of the lens drive amount when there is an object. The threshold value B for each lens drive amount is, for example, stored in the EEPROM 125c.

When the absolute value of the change amount of the focus evaluation value is not less than the predetermined threshold value B, the flow proceeds to step S13. At step S13, the camera MPU 125 determines whether the focus detection region in which the change amount of the focus evaluation value is not less than the threshold value B is only the focus detection region indicating the existence of an object at infinity. The case in which the focus detection region indicates the object at infinity means that the focus evaluation value decreases when a drive direction of the lens drive is a close-range direction, or the focus evaluation value increases when the drive direction of the lens drive is an infinity direction.

When the focus detection region in which the change amount of the focus evaluation value is not less than the threshold value B is not only the focus detection region indicating the existence of the object at infinity at step S13, the flow proceeds to step S14. At step S14, the camera MPU 125 performs the lens drive by a predetermined amount toward the close-range side. This is because there is a focus detection region indicating the existence of an object at the close-range side among the focus detection regions in which the change amount of the focus evaluation value is not less than the threshold value B. The reason why the close-range side is prioritized is as described above.

On the other hand, when the focus detection region in which the change amount of the focus evaluation value is not less than the threshold value B is only the focus detection region indicating the existence of the object at infinity at step S13, the flow proceeds to step S15. At step S15, the camera MPU 125 determines whether there is a focus detection region in which the defocus amount is calculated. When there is the focus detection region in which the defocus amount is calculated, i.e., in a case of "Yes" at step S15, the flow proceeds to step S20 in FIG. 1A since the result of the imaging-plane phase-difference AF is prioritized over the existence of the object at infinity according to the focus evaluation value. On the other hand, when there is no focus detection region in which the defocus amount is calculated, i.e., in a case of "No" at step S15, information indicating the existence of the object is only the change of the focus evaluation value. Therefore, at step S16, the camera MPU 125 performs the lens drive by a predetermined amount toward the infinity side by using the information. After the lens drive is performed by the predetermined amount toward the infinity side, the flow returns to step S3 in FIG. 1A.

The drive amount of the lens drive which is performed at each of steps S14 and S16 may be determined depending on a defocus amount which is detectable by using the imaging-plane phase-difference AF. While the detectable defocus amount varies depending on the object, the lens drive amount is previously set so as to avoid passing through the object without detecting it by the lens drive from the state in which it is undetectable by the focus detection.

When the absolute value of the change amount of the focus evaluation value is less than the predetermined threshold value B at step S12, i.e., in the case of "No" at step S12, the flow proceeds to step S17. At step S17, the camera MPU 125 determines whether there is a focus detection region in which the defocus amount is calculated. When there is no focus detection region in which the defocus amount is calculated, the flow proceeds to step S18. At step S18, the camera MPU 125 drives the lens to a previously-set fixed point. Then, at step S19, the camera MPU 125 performs out-of-focus display on the display 126, and the AF operation is finished. This is the case in which there is no focus detection region for which the defocus amount is calculated and also there is no focus detection region in which the focus evaluation value changes before and after the lens drive. In this case, there is no information indicating the existence of an object, and accordingly the focusing is impossible and the AF operation is finished.

On the other hand, when there is a focus detection region in which the defocus amount can be calculated at step S17, the flow proceeds to step S20 in FIG. 1A. In steps S20 to S23, the camera MPU 125 corrects the detected defocus amount. Subsequently, at step S24, the camera MPU 125 drives the focus lens 104 to the in-focus position. Then, at step S25, the camera MPU 125 performs an in-focus display on the display 126, and the AF operation is finished.

(Method of Calculating Vertical and Horizontal BP Correction Value)

Figure 8:
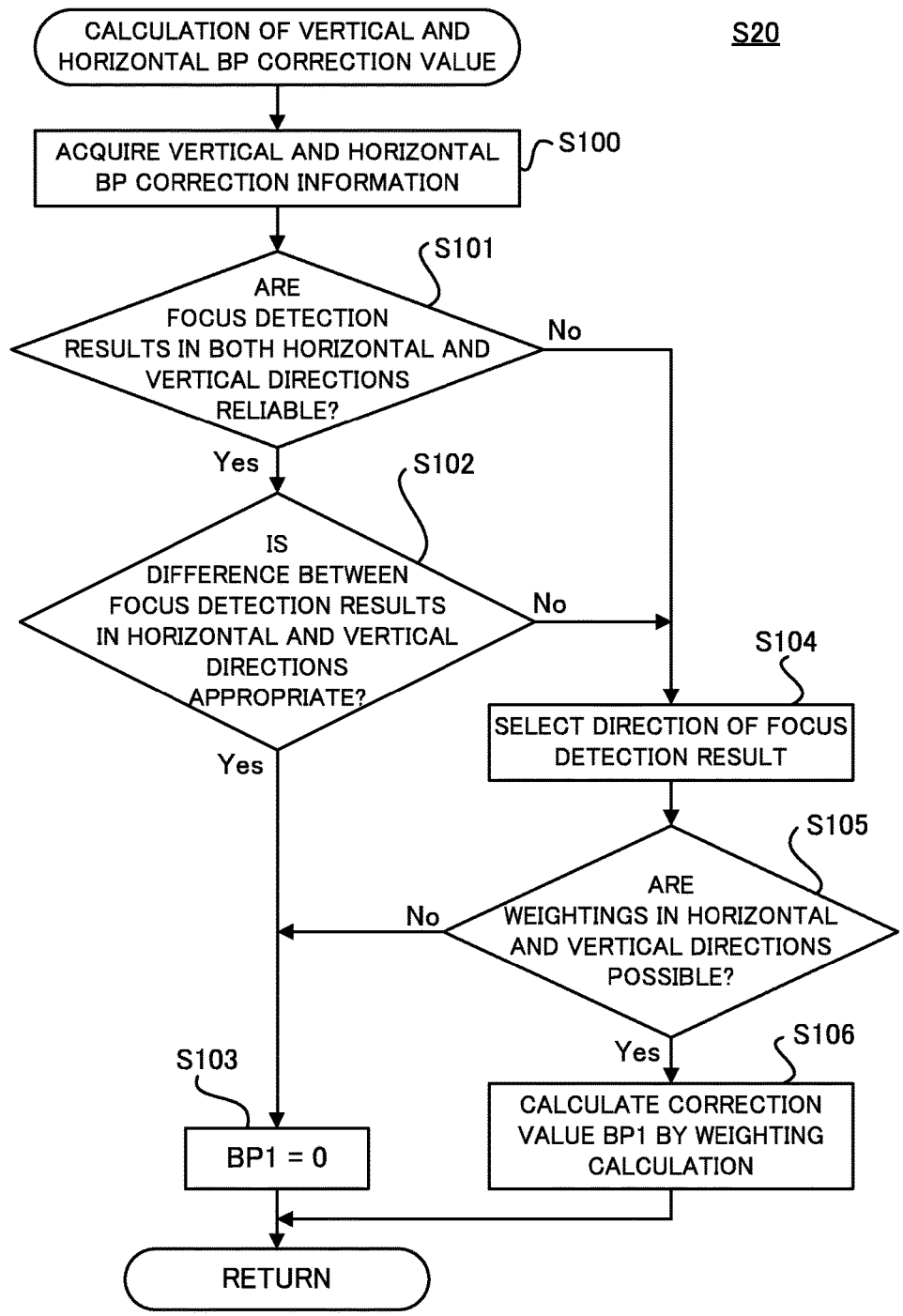
FIG. 8 is a subroutine of illustrating a flow of calculating a vertical and horizontal BP correction value (BP1) in this embodiment.

Next, referring to FIGS. 8 to 10, a method of calculating the vertical and horizontal BP correction value (BP1) at step S20 in FIG. 1A will be described. FIG. 8 is a subroutine of illustrating a flow (step S20) of calculating the vertical and horizontal BP correction value (BP1). Each step in FIG. 8 is performed mainly by the camera MPU 125 or by the imaging-plane phase-difference focus detection unit 129 or the TVAF focus detection unit 130 based on an instruction (command) of the camera MPU 125.

First, at step S100, the camera MPU 125 acquires vertical and horizontal BP correction information. The vertical and horizontal BP correction information is information obtained from the lens MPU 117 in response to a request of the camera MPU 125, and is difference information of an in-focus position in a vertical direction (second direction) relative to an in-focus position in a horizontal direction (first direction).

FIG. 9 is an example of the vertical and horizontal BP correction information which is stored in the lens memory 118, and which illustrates correction values (focus detection correction values) corresponding to the focus detection regions 219a and 218ah at the center of FIG. 7. Similarly, the lens memory 118 stores correction values corresponding to the two other focus detection regions. However, for focus detection regions symmetric with respect to an optical axis of the image pickup optical system, designed correction values are equal to each other. Accordingly, the lens memory 118 only needs to store, for the three focus detection regions, two tables of the focus detection correction values. When the correction values do not greatly change depending on a position of the focus detection region, common correction values may be stored.

As illustrated in FIG. 9, each of a zoom position and a focus position of the image pickup optical system is divided into eight zones, and the lens memory 118 stores, as vertical and horizontal BP correction information, focus detection correction values BP111 to BP188 for each of the divided zones. Accordingly, a highly-accurate correction value can be acquired depending on positions of the focus lens 104 and the first lens unit 101 of the image pickup optical system. In this embodiment, the vertical and horizontal BP correction information can be used for any of the contrast detection method and the phase-difference detection method. As described above, at step S100, the camera MPU 125 acquires the correction value corresponding to the zoom position and the focus position depending on the focus detection result to be corrected.

Subsequently, at step S101, the camera MPU 125 determines whether a reliable focus detection result is obtained for any of the horizontal direction and the vertical direction in the focus detection region to be corrected. A method of determining the reliability of the focus detection result in any of the phase-difference detection method and the contrast detection method is as described above. In this embodiment, the reliable focus detection result can be obtained in both of the horizontal direction and the vertical direction when the contrast detection method is used. Therefore, the following descriptions relating to the vertical and horizontal BP correction value are assumed to be used for the contrast detection method, and the similar processing may be performed when the focus detection by the phase-difference detection method is possible in both of the horizontal direction and the vertical direction.

When the focus detection result in any of the horizontal direction and the vertical direction is reliable at step S101, the flow proceeds to Step S102. At step S102, the camera MPU 125 determines whether a difference between the focus detection result in the horizontal direction and the focus detection result in the vertical direction is appropriate. This is a process to deal with a perspective conflict that occurs when an object at a far distance and an object at a close distance are included in a focus detection region. For example, it is a case in which there is an object which has a contrast in the horizontal direction at the far distance, and there is an object which has a contrast in the vertical direction at the near distance. In this case, the absolute value may be greater than an error caused by the astigmatism and the like of the image pickup optical system, or a difference between focus detection results having the opposite signs may be generated. When the difference between the focus detection result in the horizontal direction and the focus detection result in the vertical direction is greater than a predetermined amount (determination value C), the camera MPU 125 determines that the perspective conflict occurs. Then, the camera MPU 125 selects the horizontal direction or the vertical direction as a direction indicating the focus detection result at the close side, and the flow proceeds to step S104. The determination value C can be uniquely determined to avoid a value which is inappropriate as a correction value, or alternatively it may be set by using the correction information obtained at step S100.

When it is determined that the difference between the focus detection result in the horizontal direction and the focus detection result in the vertical direction is appropriate at step S102, the flow proceeds to step S103. At step S103, the camera MPU 125 sets a value of BP1 to 0 (BP1=0), and then the subroutine of the vertical and horizontal BP correction value calculation is finished. In this case, the camera MPU 125 (imaging-plane phase-difference focus detection unit 129 or the TVAF focus detection unit 130) performs the focus detection by using the focus detection results in the horizontal direction and the vertical direction without using the correction value. In the contrast detection method, the weighting is performed for the focus detection result depending on a magnitude relation such as a ratio of maximum values of the focus evaluation values in the horizontal direction and the vertical direction, and thus a focus detection result considering the horizontal direction and the vertical direction is acquired. In the phase-difference detection method, similarly, the weighting may be performed for the focus detection result by using a correlation amount used for correlation calculation.

On the other hand, when only one of the focus detection results in the horizontal direction and the vertical direction is reliable at step S101 or only one of the focus detection results in the horizontal direction and the vertical direction is selected at step S102, the flow proceeds to step S104. At step S104, the camera MPU 125 selects a direction of the focus detection result. In this case, the camera MPU 125 selects the direction in which the focus detection result corresponding to a closer object is calculated based on the perspective conflict determination.

Subsequently, at step S105, the camera MPU 125 determines whether it is possible to perform the weighting in the horizontal direction and the vertical direction. In the determination at step S105, in terms of the reliability of the focus evaluation value or the perspective conflict, the reliable focus detection results in both the horizontal direction and the vertical direction cannot be obtained. At step S105, however, the camera MPU 125 performs the determination to calculate the vertical and horizontal BP correction value again. Referring to FIG. 10, this will be described in detail.

Figure 10:
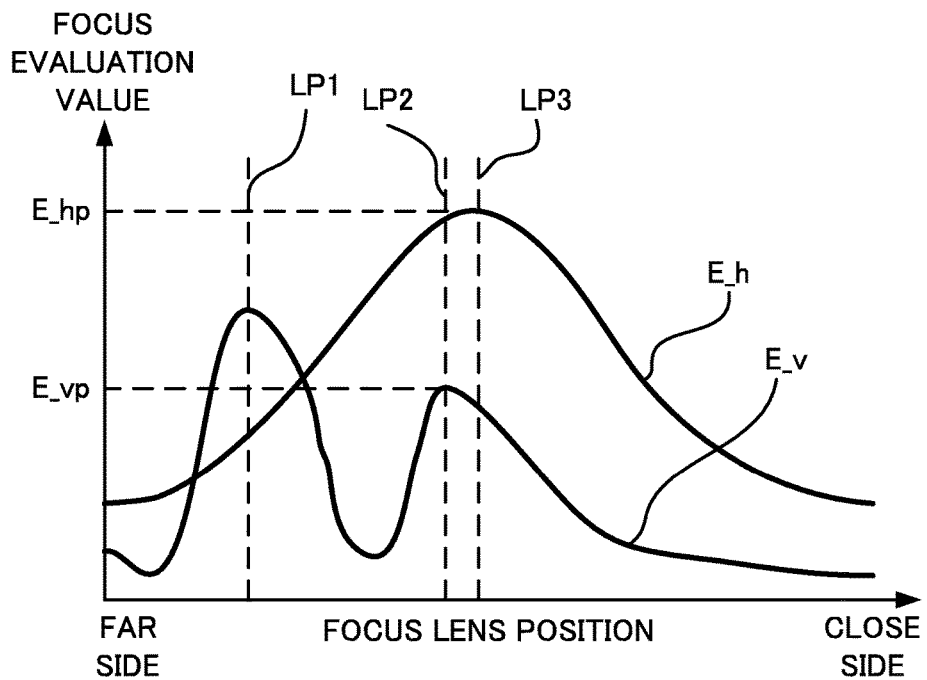
FIG. 10 is a diagram of illustrating a relation between a focus lens position and a focus evaluation value in this embodiment.

FIG. 10 is a diagram of illustrating a relation between a position (focus lens position) of the focus lens 104 and the focus evaluation value in the selected focus detection result. Symbols E_h and E_v in FIG. 10 are curves indicating changes of the focus evaluation values in the horizontal direction and the vertical direction detected by the contrast detection method, respectively. Each of symbols LP1, LP2, and LP3 in FIG. 10 indicates the focus lens position (focus detection result). In FIG. 10, the focus lens position LP3 is obtained as a reliable focus detection result based on the focus evaluation value E_h in the horizontal direction. Furthermore, the focus lens position LP1 is obtained as a reliable focus detection result based on the focus evaluation value E_v in the vertical direction. As illustrated in FIG. 10, the focus lens positions LP1 and LP3 are significantly different from each other, and they are in the perspective conflict state. Accordingly, the focus detection result (focus lens position LP3) in the horizontal direction as a focus detection result at a closer side is selected at step S104.

In this situation, at step S105, the camera MPU 125 determines whether there is a focus detection result in the vertical direction near the selected focus detection result (focus lens position LP1) in the horizontal direction. In the situation illustrated in FIG. 10, there is a focus lens position LP2. Therefore, the flow proceeds to step S106, the correction value of the focus detection result (focus lens position LP3) is calculated considering the influence of the focus detection result (focus lens position LP2). At step S106, the camera MPU 125 acquires BP1 B as one element illustrated in FIG. 9.

The vertical and horizontal correction value BP1 is calculated according to the following expression (2) by using a focus evaluation value E_hp in the horizontal direction at the focus lens position LP3 and a focus evaluation value E_vp in the vertical direction at the focus lens position LP2 illustrated in FIG. 10.

$$BP1 = BP1\_B \times E\_vp / (E\_vp + E\_hp) \times (+1) \qquad (2)$$

In this embodiment, while the vertical and horizontal BP correction value (BP1) is calculated by using expression (2) in order to calculate the correction value with respect to the focus detection result in the horizontal direction, the following expression (3) is used to correct the focus detection result in the vertical direction.

$$BP1=BP1\_B \times E\_hp/(E\_vp+E\_hp) \times (-1) \qquad (3)$$

As is clear from expressions (2) and (3), the camera MPU 125 determines information indicating that the focus evaluation value is great as a lot of contrast information included in an object to calculate the vertical and horizontal BP correction value (BP1).

As described above, the vertical and horizontal BP correction information is obtained by subtracting s focus detection position of an object having contrast information only in the horizontal direction from a focus detection position of an object having contrast information only in the vertical direction. Therefore, signs of the vertical and horizontal BP correction value (BP1) to correct the focus detection result in the horizontal direction and the vertical and horizontal BP correction value (BP1) to correct the focus detection result in the vertical direction are opposite to each other. When the processing at step S106 is completed, the subroutine of calculating the vertical and horizontal BP correction value is finished.

On the other hand, at step S105, when there is no focus detection result in the vertical direction near the selected focus detection result (focus lens position LP1) in the horizontal direction, the flow proceeds to step S103. In this cases, mostly, it is determined that the contrast information included in the object is in only one direction, and accordingly, the camera MPU 125 sets the value of BP1 to 0 (BP1=0) at step S103. When the processing at step S103 is completed, the subroutine of calculating the vertical and horizontal BP correction value is finished.

As described above, the camera MPU 125 calculates the correction value depending on the contrast information for each direction of the object, and accordingly a highly-accurate correction value can be calculated depending on a pattern of the object. While the case of the perspective conflict is described referring to FIG. 10, a maximum value is detected in each of the horizontal direction and the vertical direction, and therefore the correction value can be similarly calculated even when one of the focus detection results is unreliable.

In this embodiment, while the correction value is calculated based on the contrast information for each direction of the object at step S105, the method of calculating the correction value is not limited to this. For example, when the focus detection can be performed only in the horizontal direction, such as a focus detection by the phase-difference detection method, it may be assumed that amounts of the contrast information of the object in the horizontal direction and the vertical direction are identical to calculate the correction value. In this case, substituting E_hp=E_vp=1 in expressions (2) and (3), the correction value can be calculated. Performing the processing, a load of calculating the correction value can be reduced if a correction accuracy is within a permissible range.

With respect to the calculation of the vertical and horizontal BP correction value (BP1), while the focus detection result by the contrast detection method is described, the similar processing can be performed for a focus detection result by the phase-difference detection method. As a weighting coefficient for calculating the correction value, a change amount of a correlation amount calculated by the correlation calculation by the phase-difference detection method may be used. This uses a relation in which the change amount of the correlation amount is large with an increase of the contrast information of the object, such as a large amount of difference in brightness and darkness and many edges with the difference in brightness and darkness. Various evaluation values may be used, instead of the change amount of the correlation amount, if the similar relation can be obtained by the evaluation value.

As described above, correcting the focus detection result by using the vertical and horizontal BP correction value (BP1), highly-accurate focus detection can be performed regardless of an amount of the contrast information of an object for each direction. The correction values in the horizontal direction and the vertical direction are calculated by using common correction information as illustrated in FIG. 9, and accordingly the storage capacity of the correction information can be reduced compared to a case in which each of the correction values is stored for each direction. When the focus detection result for each direction is significantly different, the vertical and horizontal BP correction value using these focus detection results is not calculated, and accordingly the influence of the perspective conflict can be reduced. Even in a case in which the perspective conflict is assumed, by weighting the correction value depending on the magnitude of the focus evaluation value for each direction, highly-accurate correction can be performed. In other words, a first evaluation band includes a plurality of evaluation bands, and a focusing unit (focus detection apparatus) performs focusing for recording signals by using information obtained by weighing information relating to an imaging position of the plurality of evaluation bands.

(Method of Calculating Color BP Correction Value)

Figure 11:
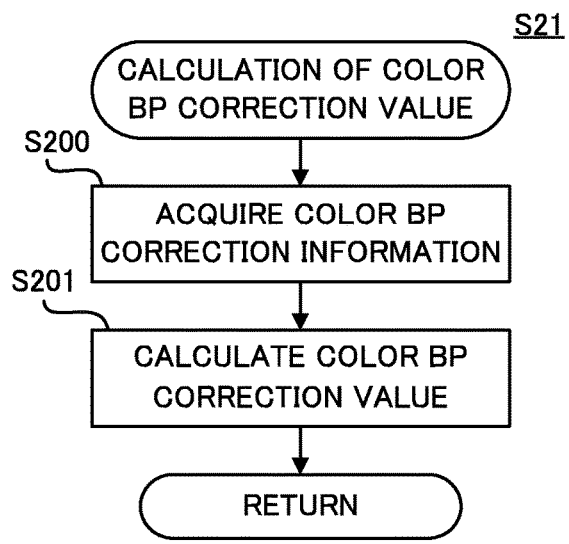
FIG. 11 is a subroutine of illustrating a flow of calculating a color BP correction value (BP2) in this embodiment.

Next, referring to FIG. 11 and FIGS. 12A and 12B, a method of calculating the color BP correction value (BP2) at step S21 in FIG. 1A will be described. FIG. 11 is a subroutine of illustrating a flow (step S21) of calculating the color BP correction value (BP2). Each step in FIG. 11 is performed mainly by the camera MPU 125, or the imaging-plane phase-difference focus detection unit 129 or the TVAF focus detection unit 130 based on an instruction (command) of the camera MPU 125.

First, at step S200, the camera MPU 125 acquires color BP correction information. The color BP correction information is information obtained from the lens MPU 117 in response to a request of the camera MPU 125, and is difference information of an in-focus position detected by using signals of the other colors (red (R) and blue (B)) relative to an in-focus position detected by using signals of green (G) color.

FIGS. 12A and 12B are one example of the color BP correction information stored in the lens memory 118, and illustrate correction values (focus detection correction values) corresponding to the focus detection regions 219a and 218ah at the center of FIG. 7. Similarly, the lens memory 118 stores correction values with respect to the two other focus detection regions. However, for focus detection regions symmetric with respect to an optical axis of the image pickup optical system, designed correction values are equal to each other. Accordingly, the lens memory 118 only needs to store, for the three focus detection regions, two tables of the focus detection correction values. When the correction values do not greatly change depending on a position of the focus detection region, common correction values may be stored.

In FIGS. 12A and 12B, similarly to FIG. 9, each of the zoom position and the focus position of the image pickup optical system is divided into eight zones, and the lens memory 118 stores correction values BP211 to BP288 and BP311 to 388 for each of the divided zones. Accordingly, a highly-accurate correction value can be acquired depending on positions of the focus lens 104 and the first lens unit 101 of the image pickup optical system. Each of the focus detection correction values BP211 to BP288 in FIG. 12A is a difference of a focus detection result detected by using output signals of pixels having a red (R) color filter relative to a focus detection result detected by using output signals of pixels having a green (G) color filter. Each of the focus detection correction values BP311 to BP388 in FIG. 12B is a difference of a focus detection result detected by using output signals of pixels having a blue (B) color filter relative to the focus detection result detected by using output signals of pixels having the green (G) color filter.

In this embodiment, the green (G), red (R), and blue (B) mean signals obtained for each color filter provided to pixels on the image pickup element 122 described above, but the definition of each color is not limited to this. For example, a spectral detector that detects spectral information of an object is further provided, and a wavelength or a wavelength band of the green (G), red (R), and blue (B) may be set according to an output of the spectral detector. The color BP correction information can also be used for the focus detections by both the contrast detection method and the phase-difference detection method. At step S200, the camera MPU 125 acquires the correction value corresponding to the zoom position and the focus position depending on the focus detection result to be corrected.

Subsequently, at step S201, the camera MPU 125 calculates the color BP correction value (BP2). When the camera MPU 125 acquires BP_R as an element in FIG. 12A and BP_B as an element in FIG. 12B at step S200, the color BP correction value (BP2) is calculated by the following expression (4).

$$BP2 = K\_R \times BP\_R + K\_B \times BP\_B \quad (4)$$

In expression (4), symbols K_R and K_B are coefficients of the correction information of each color. The coefficients K_R and K_B are values that have correlations with amounts of the red (R) and blue (B) information, respectively, relative to the green (G) information included in an object, and the coefficient K_R is a great value for an object including much red color and the coefficient K_B is a great value for an object including much blue color. Both of the coefficients K_R and K_B are small values for an object including much blue color. The coefficients K_R and K_B may be previously set based on representative spectral information as an object. Alternatively, the coefficients K_R and K_B may be set depending on the spectral information of an object if the spectral information of the object can be acquired by using a unit which detects spectral light of the object. The camera MPU 125 completes the calculation of the color BP correction value (BP2) at step S201 and then the subroutine is finished.

In this embodiment, table data which store, for each focus detection region, the correction values to be used for the focus detection are used as illustrated in FIG. 9 or FIGS. 12A and 12B, but the method of storing the correction values is not limited to this. For example, an intersection of the image pickup element 122 and the optical axis of the imaging optical system (image pickup optical system) is set as an origin, a coordinate in which the horizontal direction and the vertical direction of the image pickup apparatus 10 are X and Y axes is set, and thus the correction value at the center coordinate of the focus detection region may be obtained as a function of X and Y. In this case, an information amount to be stored as focus detection correction values can be reduced.

In this embodiment, the correction value used for the focus detection, which is calculated by using the vertical and horizontal BP correction information or the color BP correction information, is calculated independently of spatial frequency information of a pattern of an object. Accordingly, highly-accurate correction can be performed without increasing the amount of correction information to be stored. However, the method of calculating the correction value is not limited to this. Similarly to a method of calculating the spatial frequency BP correction value (BP3) described below, a correction value according to a spatial frequency component of an object may be calculated by using the vertical and horizontal correction information or the color BP correction information for each spatial frequency.

(Method of Calculating Spatial Frequency BP Correction Value)

Figure 13:
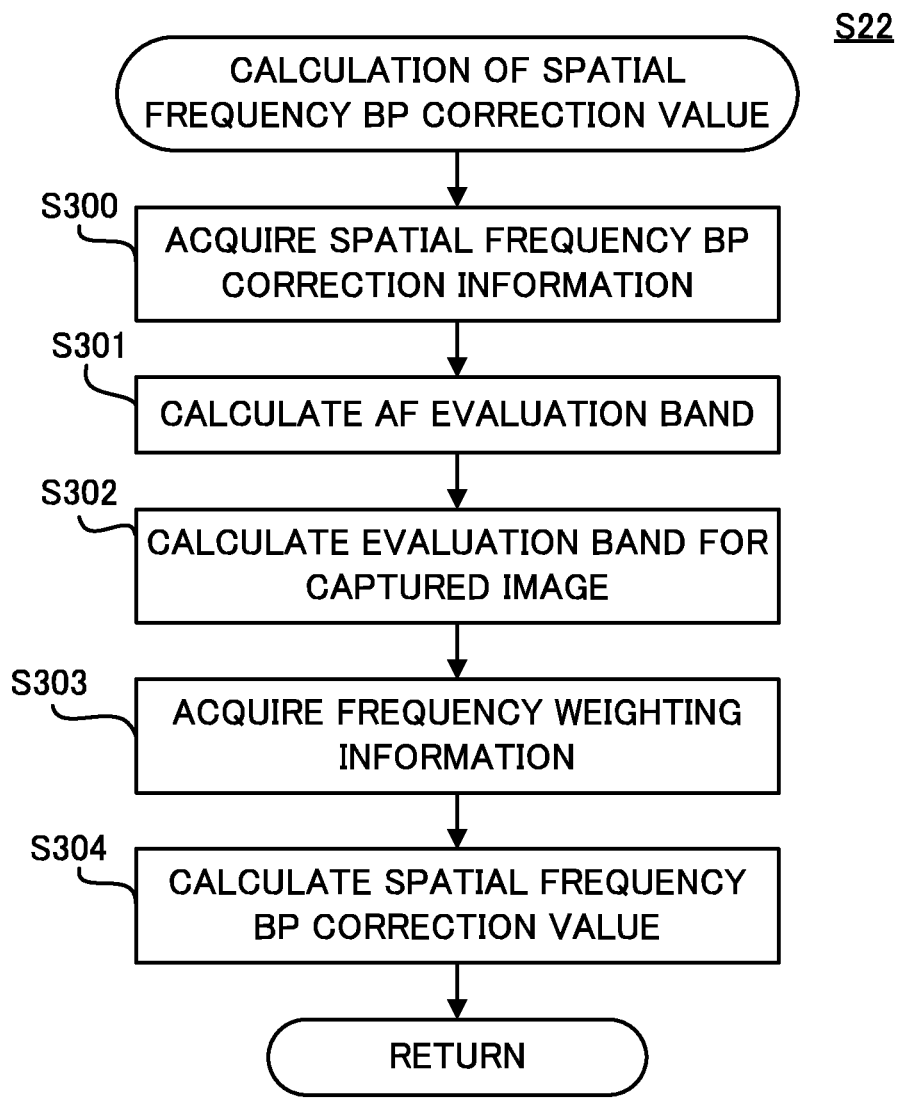
FIG. 13 is a subroutine of illustrating a flow of calculating a spatial frequency BP correction value (BP3) in this embodiment.

Next, referring to FIGS. 13 to 16, a method of calculating the spatial frequency BP correction value (BP3) at step S22 in FIG. 1A will be described. FIG. 13 is a subroutine of illustrating a flow (step S22) of calculating the spatial frequency BP correction value (BP3). Each step in FIG. 13 is performed mainly by the camera MPU 125, or the imaging-plane phase-difference focus detection unit 129 or the TVAF focus detection unit 130 based on an instruction (command) of the camera MPU 125.

First, at step S300, the camera MPU 125 (acquisition unit 125d) acquires spatial frequency BP correction information (first information relating to a spatial frequency). The spatial frequency BP correction information is information obtained from the lens MPU 117 in response to a request of the camera MPU 125, and is information relating to an imaging position of the image pickup optical system for each spatial frequency of an object.

Figure 14A:
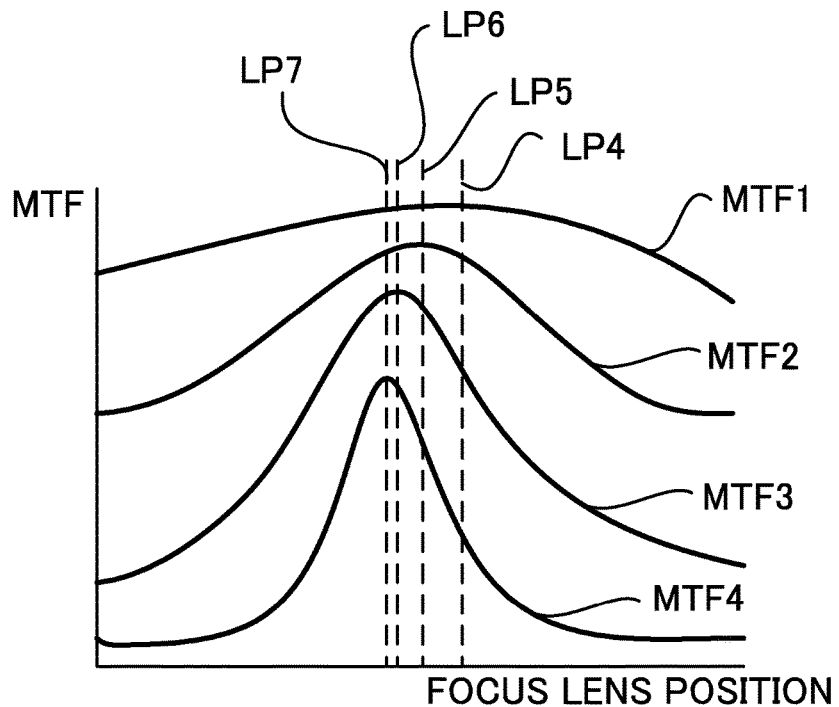
FIGS. 14A and 14B are diagrams of illustrating a defocus MTF of the image pickup optical system in this embodiment.
Figure 14B:
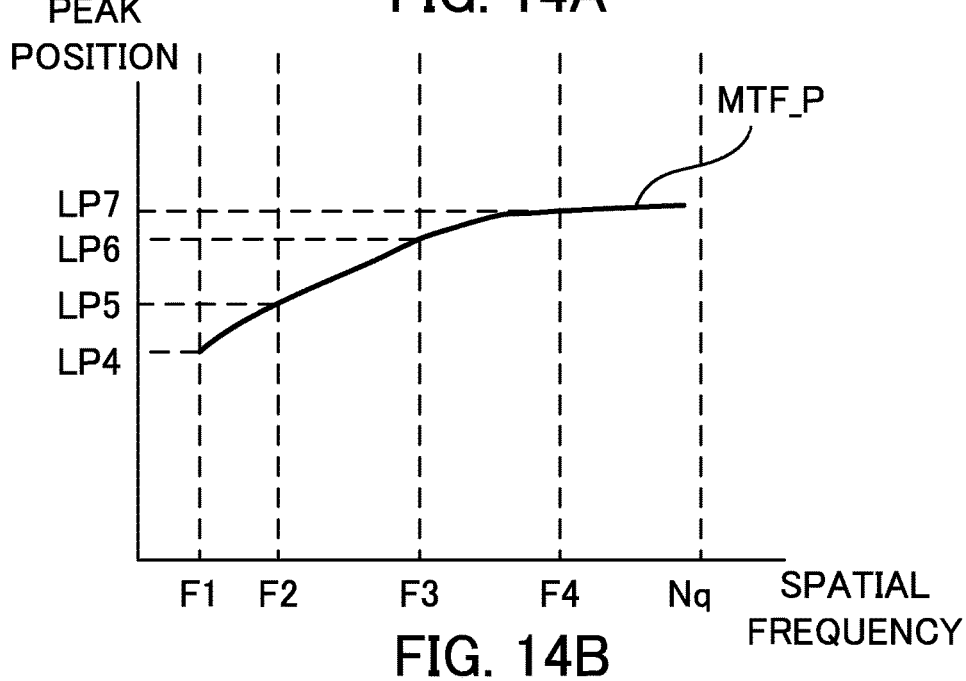

Referring to FIGS. 14A and 14B, an example of the spatial frequency BP correction information stored in the lens memory 118 will be described. FIG. 14A illustrates a defocus MTF of the image pickup optical system. In FIG. 14A, a horizontal axis and a vertical axis indicate a position of the focus lens 104 (focus lens position) and a strength of the MTF, respectively. Four types of curves depicted in FIG. 14A are MTF curves for each spatial frequency, and MTF1, MTF2, MTF3 and MTF4 indicate the MTF curves in which the spatial frequency increases in this order. The MTF curve for a spatial frequency F1 (lp/mm) corresponds to MTF1. Similarly, spatial frequencies F2, F3, and F4 (lp/mm) correspond to MTF2, MTF3, and MTF4, respectively. Symbols LP4, LP5, LP6, and LP7 are focus lens positions (positions of the focus lens 104) corresponding to maximum values of the defocus MTF curves MTF1 to MTF4, respectively.

FIG. 14B illustrates the focus lens position indicating the maximum values of the defocus MTFs for each spatial frequency as characteristics of the image pickup optical system. A vertical axis of FIG. 14B indicates the focus lens positions LP4, LP5, LP6, and LP7 (peak positions) corresponding to the maximum values of the defocus MTFs for the spatial frequencies (F1 to F4) in FIG. 14A, respectively. In this embodiment, the lens memory 118 stores four data as MTF_P(n) (1≤n≤4). The lens memory 118 stores the spatial frequency BP correction information for each of the positions of the focus detection regions, similarly to the vertical and horizontal BP correction information and the color BP correction information. Each of the zoom position and the focus position of the image pickup optical system is divided into eight zones, and the lens memory 118 stores the spatial frequency BP correction information for each of the divided zones. However, this embodiment is not limited to them.

Similarly to the vertical and horizontal correction information and the color BP correction information described above, the number of the focus detection regions and the number of dividing the zoom position or the focus position can be arbitrarily set. As the set number increases, a memory capacity required for storing data increases, but highly-accurate correction can be expected. The spatial frequency BP correction information can be used for both the contrast detection method and the phase-difference detection method. At step S300, the camera MPU 125 acquires a correction value corresponding to the zoom position and the focus position depending on the focus detection result to be corrected.

Subsequently, at step S301, the camera MPU 125 (determination unit 125e) calculates a band (AF evaluation band, i.e., second information relating to a second evaluation band of focus detection signals) of signals used for focus detection by the contrast detection method or the phase-difference detection method. In this embodiment, the camera MPU 125 calculates the AF evaluation band (second information) considering influences of the object, the image pickup optical system, a sampling of the image pickup element, and the digital filter used for the evaluation. A method of calculating the AF evaluation band will be described below. Subsequently, at step S302, the camera MPU 125 (determination unit 125e) calculates a band (captured image evaluation band, i.e., second information relating a first evaluation band of image pickup signals) of signals used for image pickup signals. Similarly to the calculation of the AF evaluation band at step S302, the camera MPU 125 calculates the captured image evaluation band (second information) considering influences of the object, the image pickup optical system, a sampling of the image pickup element, and the evaluation band for a user viewing the captured image.

Referring to FIGS. 15A to 15F, the calculations of the AF evaluation band (second evaluation band of the focus detection signals) and the captured image evaluation band (first evaluation band of the image pickup signals) performed at steps S301 and S302, respectively, in FIG. 13 will be described. The AF evaluation band and the captured image evaluation band correspond to evaluation frequency information (information relating to an evaluation frequency of an object). Each of FIGS. 15A to 15F illustrates a strength for each spatial frequency, and the horizontal axis and vertical axis indicate the spatial frequency and the strength, respectively. When the first evaluation band of the recording signals (image pickup signals) is switched by a switching unit (not illustrated), the camera MPU 125 changes the correction value at the imaging position.

Figure 15A:
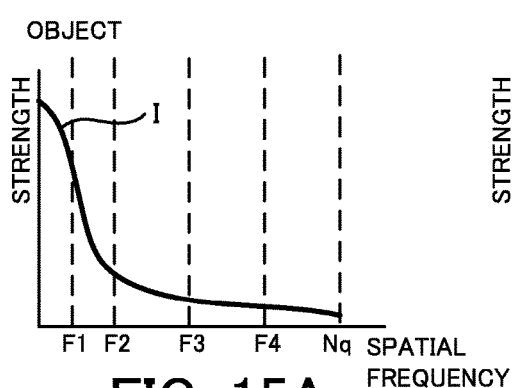
FIGS. 15A to 15F are diagrams of illustrating various spatial frequency characteristics in this embodiment.

FIG. 15A illustrates a spatial frequency characteristic (I) of an object. Symbols F1, F2, F3, and F4 on the horizontal axis are spatial frequencies corresponding to the MTF curves (MTF1 to MTF4) in FIG. 14A, respectively. Symbol Nq is a Nyquist frequency that is determined depending on a pixel pitch of the image pickup element 122. The spatial frequencies F1 to F4 and the Nyquist frequency Nq are illustrated similarly in FIGS. 15B to 15F described below.

In this embodiment, a previously-stored representative value is used as the spatial frequency characteristic (I) of the object. In FIG. 15A, the spatial frequency characteristic (I) of the object is depicted by a curve, and it discretely includes values corresponding to the spatial frequencies F1, F2, F3, and F4, represented as I(n) (1≤n≤4). In this embodiment, while the previously-stored spatial frequency characteristic of the object is used, the spatial frequency characteristic of the object to be used may change depending on the object for the focus detection. Performing processing such as FFT processing on the captured image signal, spatial frequency information of the object can be obtained. In the processing, a calculation amount increases but the correction value can be calculated depending on the object for the focus detection, and accordingly, highly-accurate focusing (focus control) is possible. More simply, a previously-stored various spatial frequency characteristic may be selectably used depending on an amount of the contrast information of the object.

Figure 15D:
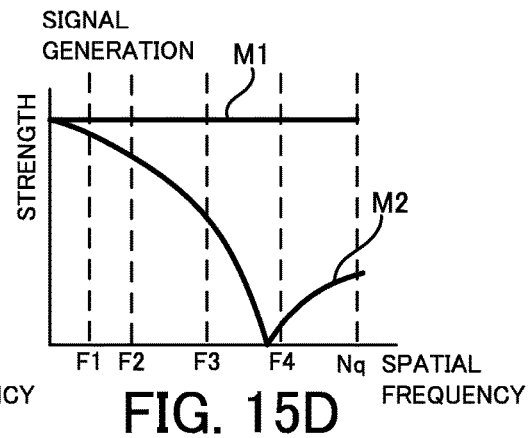
Figure 15B:
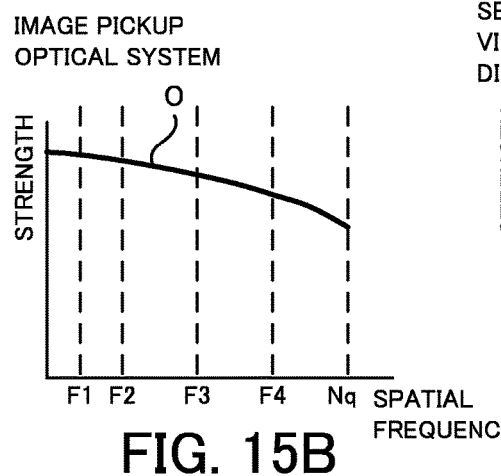

FIG. 15B illustrates a spatial frequency characteristic (O) of the image pickup optical system. The information may be acquired from the lens MPU 117, or alternatively it may be stored in the RAM 125b in the camera MPU 125. The information stored in this case may be a spatial frequency characteristic for each defocus state or a spatial frequency characteristic only for an in-focus state. The spatial frequency BP correction value (BP3) is calculated near the in-focus state, and accordingly highly accurate correction can be performed when the spatial frequency characteristic for the in-focus state is used. However, when the spatial frequency characteristic for each defocus state is used, it is possible to perform the focus control with higher accuracy although a calculation load increases. A spatial frequency characteristic to be used may be selected from among the spatial frequency characteristics for respective defocus states by using a defocus amount obtained by the focus detection of the phase-difference detection method. In FIG. 15B, the spatial frequency characteristic (O) of the image pickup optical system is depicted by a curve, and it discretely includes values corresponding to the spatial frequencies F1, F2, F3, and F4, represented as I(n) (1≤n≤4).

Figure 15E:
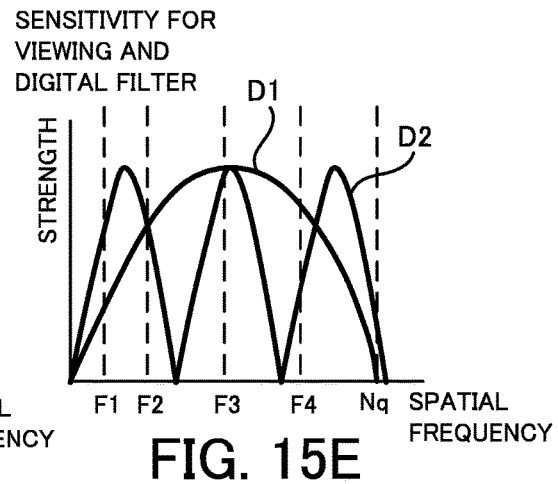
Figure 15C:
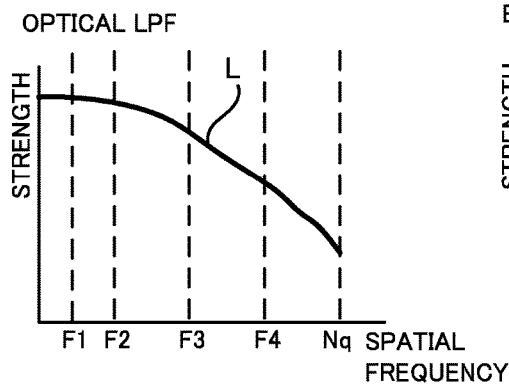

FIG. 15C illustrates a spatial frequency characteristic (L) of the optical low-pass filter 121. The information is stored in the RAM 125b in the camera MPU 125. In FIG. 15C, the spatial frequency characteristic (L) of the optical low-pass filter 121 is depicted by a curve, and it discretely includes values corresponding to the spatial frequencies F1, F2, F3, and F4, represented as L(n) (1≤n≤4).

FIG. 15D illustrates spatial frequency characteristics (M1, M2) by a signal generation. As described above, the image pickup element 122 of this embodiment has two types of readout modes. In the first readout mode, i.e., all-pixel readout mode, the spatial frequency characteristic does not change during the signal generation. The spatial frequency characteristic (M1) in FIG. 15D is the spatial frequency characteristic in the first readout mode. On the other hand, in the second readout mode, i.e., a thinning readout mode, the spatial frequency characteristic changes during the signal generation. As described above, in order to improve the S/N ratio by adding signals when thinning in the X direction, a low-pass effect occurs by the addition. The spatial frequency characteristic (M2) in FIG. 15D indicates a spatial frequency characteristic during the signal generation in the second readout mode. In this embodiment, the influence of the thinning is not considered and the low-pass effect by the addition is illustrated. In FIG. 15D, the spatial frequency characteristics (M1, M2) by the signal generation are depicted by a straight line and a curve, respectively, and they discretely include values corresponding to the spatial frequencies F1, F2, F3, and F4, represented as M1(n) and M2(n) (1≤n≤4).

FIG. 15E illustrates a spatial frequency characteristic (D1) indicating a sensitivity for each spatial frequency when viewing a captured image and a spatial frequency characteristic (D2) of a digital filter used for the processing of the AF evaluation signals. The sensitivity for each spatial frequency when viewing the captured image is affected by an individual difference of a viewer (user), an image size or a viewing distance, a viewing environment such as a brightness, and the like. In this embodiment, as a representative value, the sensitivity for each spatial frequency when viewing the captured image is set and stored. The viewing distance means that a distance from the user to a display on which the recording image is displayed or a distance from the user to a paper on which the recording image is printed. On the other hand, a folding noise of a frequency component of signals occurs due to an influence of the thinning in the second readout mode. The spatial frequency characteristic (D2) corresponds to a spatial frequency characteristic of the digital filter considering the influence. In FIG. 15E, the spatial frequency characteristic (D1) when viewing the captured image and the spatial frequency characteristic (D2) of the digital filter are depicted by a curves, and they discretely include values corresponding to the spatial frequencies F1, F2, F3, and F4, represented as D1(n) and D2(n) ($1 \leq n \leq 4$).

As described above, by storing various pieces of information in the camera (camera body 120) or the lens (lens unit 100), an evaluation band W1 of a captured image and an AF evaluation band W2 are calculated by the following expressions (5) and (6), respectively.

$$W1(n) = I(n) \times O(n) \times L(n) \times M1(n) \times D1(n) (1 \leq n \leq 4) \quad (5)$$

$$W2(n) = I(n) \times O(n) \times L(n) \times M2(n) \times D2(n) (1 \leq n \leq 4) \quad (6)$$

Figure 15F:
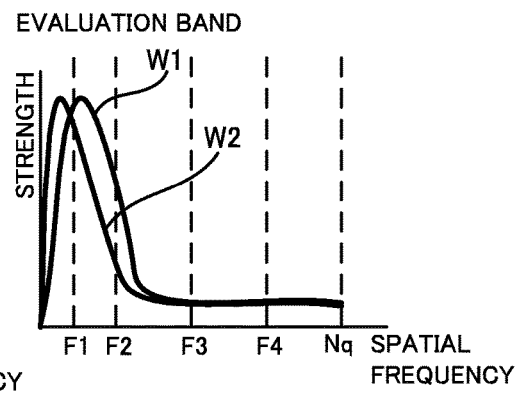

FIG. 15F illustrates the evaluation band W1 of the captured image (first evaluation band of the image pickup signals) and the AF evaluation band W2 (second evaluation band of the focus detection signals). By performing the calculations represented by expressions (5) and (6), with respect to a factor which determines an in-focus state of the captured image, the impact of its influence can be quantified for each spatial frequency. Similarly, the impact of the influence of an error contained in a focus detection result can be quantified for each spatial frequency. The information stored in the image pickup apparatus 10 may be a previously-calculated evaluation band W1 of the captured image or AF evaluation band W2. By performing the calculation for each correction as described above, the correction value can be flexibly calculated when the digital filter used for the AF evaluation or the like is changed. On the other hand, by storing the information in advance, the calculations as represented by expressions (5) and (6) and the storage capacity for various data can be reduced or removed. It is not necessary to complete all calculations in advance, and accordingly for example only the spatial frequency characteristics of the image pickup optical system and the object may be previously calculated and be stored in the image pickup apparatus 10 to reduce the storage capacity for the data or reduce the calculation amount.

In FIGS. 15A to 15F, to simplify the descriptions, the four spatial frequencies (F1 to F4) are used, and the spatial frequency characteristic of the evaluation band for the captured image or the AF is precisely reproducible with an increase of the number of the spatial frequencies for which data are provided, and thus a highly-accurate correction value can be calculated. With respect to the AF evaluation band and the evaluation band of the captured image, the relation between corresponding spatial frequencies and representative values may be individually set. For example, the spatial frequency F1 is a representative value within a region of 0 to (F1+F2)/2. Similarly, the spatial frequency F2 is a representative value within a range of (F1+F2)/2 to (F2+F3)/2, and the spatial frequency F3 is a representative value within a range of (F2+F3)/2 to (F3+F4)/2. On the other hand, the spatial frequency F4 is a representative value within a range of (F3+F4)/2 to a responsive limit frequency of a spatial frequency region of the image pickup optical system. As a result, a highly-accurate correction value can be calculated, as evaluation bands, without ignoring components of a spatial frequency higher than the Nyquist frequency determined by the pixel pitch of the image pickup element 122. On the other hand, by reducing the number of types of the spatial frequencies to be used for the calculation of the correction value, the calculation amount can be reduced. The subsequent calculations may be performed while one spatial frequency which represents each of the spatial frequency characteristics of the evaluation band of the captured image and the AF evaluation band is stored.

Returning to FIG. 13, the explanation of the subroutine in this embodiment is continued. At step S303, the camera MPU 125 (setting unit 125f) acquires frequency weighting information (third information relating to a weighting depending on the spatial frequency characteristic). The frequency weighting information is information to be used when calculating an in-focus position of the captured image or an in-focus position detected by the AF. As illustrated in FIGS. 14A and 14B, in this embodiment, the lens memory 118 stores the focus lens position that indicates a maximum value of the defocus MTF for each frequency. Therefore, the information of the maximum value of the defocus MTF is treated so that contributions to the in-focus position for respective frequency are equal to each other. On the other hand, as illustrated in FIG. 14A, a shape of the curve of the defocus MTF varies depending on the frequency. In other words, the defocus MTF (MTF1) corresponding to a low spatial frequency has a curve shape with a small change with respect to the focus lens position and with a wide half-value width, compared to the defocus MTF (MTF4) corresponding to a high spatial frequency. On the contrary, the high spatial frequency component greatly changes with the change of the defocus state. This is caused by a general phenomenon in which the amplitude (MTF) of an object image signal is reduced from the high spatial frequency component due to the defocus.

Accordingly, when evaluating the captured image, the contribution to the in-focus position recognized from the captured image or detected by the AF is greater for the high spatial frequency component than the low spatial frequency component. In other words, the in-focus position can be calculated with higher accuracy with the use of peak information of the defocus MTF in the high spatial frequency than with the use of peak information of the defocus MTF in the low spatial frequency.

As a method of calculating the in-focus position recognized from the captured image or detected by the AF, the weighting may be performed based on the evaluation band of the captured image and the evaluation band of the AF by using the defocus MTF as illustrated in FIG. 14A. In this case, the defocus MTF has a curve shape with a narrow half-value width as the spatial frequency is higher since the weighting is performed for each spatial frequency. Accordingly, the defocus MTF for the high spatial frequency having the curve shape with a narrow half-value width is emphasized compared to the defocus MTF for the low spatial frequency having the curve shape with a wide half-value width, and as a result the in-focus position can be calculated with high accuracy.

On the other hand, when using the defocus MTF information, the necessary information amount is large and the calculation load increases. In this embodiment, the information amount or the calculation load can be reduced by using the peak information of the defocus MTF. On the other hand, the peak information of the defocus, as described above, does not contain information corresponding to a half-value width of the defocus MTF information for each spatial frequency. Therefore, in this embodiment, the weighting of the stored information of the maximum value of the defocus MTF is performed for each frequency by using frequency weighting information. Furthermore, by increasing the weighting for the information of the maximum value of the defocus MTF for a higher spatial frequency, the in-focus position is calculated with high accuracy.

Figure 16:
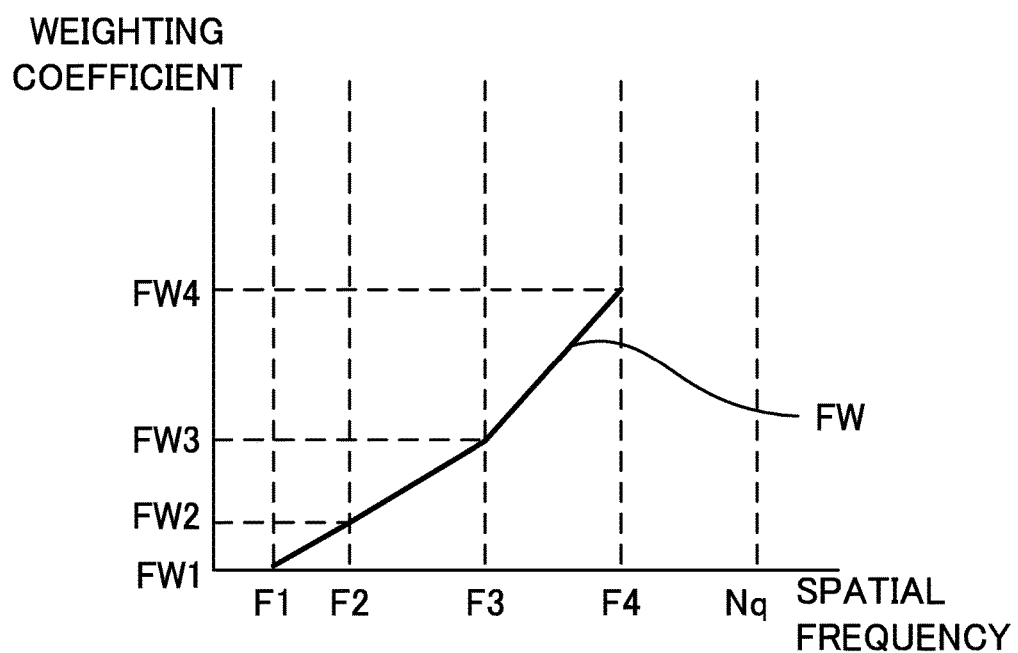
FIG. 16 is an example of a frequency weighting coefficient in this embodiment.

Subsequently, referring to FIG. 16, the frequency weighting information will be described. FIG. 16 is a diagram of illustrating a weighting coefficient for each spatial frequency, and the horizontal axis and the vertical axis indicate the spatial frequency and the frequency weighting coefficient, respectively. In FIG. 16, the frequency weighting information (FW) is depicted by a curve, and it discretely includes values corresponding to the spatial frequencies F1, F2, F3, and F4, represented as $FW(n)$ ($1 \leq n \leq 4$). In other words, frequency weighting coefficients for the spatial frequencies F1, F2, F3, and F4 are indicated as $FW(1)$, $FW(2)$, $FW(3)$, and $FW(4)$, respectively.

In this embodiment, as described above, the coefficients are set to increase the weighting with an increase of the spatial frequency since the contribution to the in-focus position increases with the increase of the spatial frequency. In this embodiment, the frequency weighting coefficients have a relation represented by the following expression (7).

$$FW1(=0)<FW2<FW3<FW4 \quad (7)$$

The frequency weighting coefficient may be determined depending on the extent of a width of a mountain shape near the maximum value of the defocus MTF. For example, the frequency weighting coefficient can be set so as to be proportional to an inverse of the half-value width for the spatial frequency. When the width of the mountain shape near the maximum value of the defocus MTF is not less than a predetermined value, the frequency weighting coefficient may be set to zero as FW1 in FIG. 16. This is because the MTF of the corresponding spatial frequency is not substantially changed by the defocus and its contribution to the in-focus position recognized from the captured image or detected by the AF is not large.

Typically, in a spatial frequency distribution of an object, as illustrated in FIG. 15A, a lot of components are contained in a low spatial frequency in many cases. Accordingly, with respect to the evaluation band W1 of the captured image and the AF evaluation band W2 through the processing described above, the weighting for the low spatial frequency is increased compared to the weighting for the high spatial frequency in many cases. In this embodiment, the frequency weighting coefficient is reduced for the component in the low spatial frequency which has a small contribution to the in-focus position even when there are a lot of components occupied by evaluation signals. On the contrary, the frequency weighting coefficient is increased for the component in the high spatial frequency which has a large contribution to the in-focus position even when there are a few components occupied by evaluation signals.

In this embodiment, the frequency weighting information is always configured by using the same combination value, but it may change depending on an image capturing condition such as an image pickup lens, an F number, a zoom state, or focus state. When the frequency weighting information changes for each image pickup lens, it may be acquired from the lens unit 100.

At step S304 in FIG. 13, the camera MPU 125 (calculation unit 125g) calculates a spatial frequency BP correction value (BP3), i.e., correction value relating to a spatial frequency. The camera MPU 125 corresponds to a best imaging-plane detector. When calculating the spatial frequency BP correction value (BP3), the camera MPU 125 calculates an in-focus position (P_img) of a captured image and an in-focus position (P_AF) detected by the AF by using the defocus MTF information, the evaluation bands W1 and W2, and the frequency weighting coefficient FW as represented by the following expressions (8) and (9), respectively.

$$P\_img=MTF\_P(1)\times W1(1)\times FW(1)+MTF\_P(2)\times W1(2)\times FW(2)+MTF\_P(3)\times W1(3)\times FW(3)+MTF\_P(4)\times W1(4)\times FW(4) \quad (8)$$

$$P\_AF=MTF\_P(1)\times W2(1)\times FW(1)+MTF\_P2)\times W2(2)\times FW(2)+MTF\_P(3)\times W2(3)\times FW(3)+MTF\_P(4)\times W2(4)\times FW(4) \quad (9)$$

In expressions (8) and (9), with respect to the maximum value information of the defocus MTF for each spatial frequency illustrated in FIG. 14B, the weighting of the evaluation band of the captured image or the AF calculated at step S301 and S302 in FIG. 13 and the frequency weighting acquired at step S303 are performed. As a result, the in-focus position (P_img) of the captured image and the in-focus position (P_AF) detected by the AF are calculated. At step S304, the spatial frequency BP correction value (BP3) is calculated by the following expression (10).

$$BP3=P\_AF-P\_img \quad (10)$$

According to expression (10), a best focus correction value (BP correction value) to correct an error which may occur between the in-focus position of the captured image and the in-focus position detected by the AF can be calculated.

As described above, in this embodiment, a control apparatus (camera MPU 125) includes an acquirer (acquisition unit 125d) and a processor (determination unit 125e, setting unit 125f, and calculation unit 125g). The acquirer acquires first information (spatial frequency BP correction information) relating to a peak position of a spatial frequency that an image pickup optical system transmits for each spatial frequency. The processor calculates second information relating to a first evaluation band (evaluation band for a captured image) used for processing of image pickup signals and a second evaluation band (AF evaluation band) used for processing of focus detection signals. Furthermore, the processor calculates third information relating to a weighting for each spatial frequency, and it calculates correction information (spatial frequency BP correction value (BP3)) of focus detection based on the first, second, and third information.

Preferably, the first information is information corresponding to a focus lens position for each spatial frequency of an object where the spatial frequency is maximized. Preferably, the second information contains information of a difference or a ratio of the first evaluation band of the image pickup signals and the second evaluation band of the focus detection signals. Preferably, the second information changes depending on the spatial frequency. Preferably, the processor is configured to calculate the correction information (spatial frequency BP correction value) of the focus detection based on a difference between an in-focus position (P_img) for the image pickup signals and an in-focus position (P_AF) for the focus detection signals.

Preferably, the second information contains information relating to an evaluation frequency of an object. Preferably, the second information contains information determined by using at least one of spatial frequency characteristics of an object image (FIG. 15A), spatial frequency characteristics of an image pickup optical system (FIG. 15B), spatial frequency characteristics of an optical low-pass filter (FIG. 15C), spatial frequency characteristics of the image pickup signals and the focus detection signals output from an image pickup element (FIG. 15D or 15F), and spatial frequency characteristics relating to a sensitivity of the image pickup signals and a digital filter used for processing of the focus detection signals (FIG. 15E).

Preferably, the third information contains information set so as to increase the weighting (weighting coefficient) with an increase of the spatial frequency. Preferably, the third information contains information set so that a weighting relating to a spatial frequency lower than a predetermined spatial frequency is zero. Preferably, the third information contains information set so as to increase the weighting (weighting coefficient) with a decrease of a half-value width of spatial frequency characteristics for each spatial frequency when a focus state is changed.

Preferably, the control apparatus (camera MPU 125) includes a focus controller (focus control unit 125*h*) that performs focus control based on an in-focus position corrected by using the correction information. In this embodiment, the image pickup apparatus 10 includes the camera body 120 and the lens unit 100, and accordingly the focus control unit 125*h* of the camera MPU 125 controls the focus lens 104 via the lens MPU 117.

As described above, the in-focus position of the captured image changes depending on the spatial frequency characteristics of the object, the image pickup optical system, and the optical low-pass filter, the spatial frequency characteristics during the signal generation, the spatial frequency characteristics indicating the sensitivity for each frequency when viewing the image, and the like. Furthermore, the in-focus position of the captured image may change depending on image processing performed on the captured image.

In this embodiment, the spatial frequency characteristics are calculated retroactive to the process of generating the captured image, and accordingly the in-focus position of the captured image can be calculated with high accuracy. For example, the in-focus position of the captured image may change depending on a recording size when recording the captured image, super-resolution processing performed in the image processing, a sharpness, or a display size. When the image size, the magnification, the viewing distance, or the like, to be viewed after recording the captured image can be known in advance, the influence is given to the evaluation band for the user. The evaluation band for the user is set to have characteristics in which a high-frequency component is weighted with an increase of the image size or with a decrease of the viewing distance. As a result, the in-focus position of the captured image is changed.

Preferably, the first evaluation band of the recording signals (image pickup signals) changes depending on an interval between pixels of the image pickup element for the recording signals and on signal addition processing of the recording signals performed in the image pickup element. Preferably, the first evaluation band of the recording signals changes depending on signal thinning processing of the recording signals performed in the image pickup element and on a type of image processing performed on the recording signals. Preferably, the first evaluation band changes depending on the image size and the display size of the recording signals. Preferably, the first evaluation band of the recording signals changes depending on the viewing distance and the brightness of the image of the recording signals.

Similarly, preferably, the second evaluation band of the focus detection signals changes depending on the interval between pixels of the image pickup element for the focus detection signals. Preferably, the second evaluation band of the focus detection signals changes depending on the signal addition processing of the recording signals performed in the image pickup element, the signal thinning processing of the recording signals performed in the image pickup element, and a type of filtering processing.

On the other hand, similarly, the in-focus position detected by the AF changes depending on the spatial frequency characteristics of the object, the image pickup optical system, and the optical low-pass filter, the spatial frequency characteristics during the signal generation, the spatial frequency characteristics of the digital filter used for the AF evaluation, and the like. In this embodiment, the spatial frequency characteristics are calculated retroactive to the process of generating the signals used for the AF, and accordingly the in-focus position detected by the AF can be calculated with high accuracy. For example, the AF can be flexibly performed in the first readout mode. In this case, the spatial frequency characteristics during the signal generation may be changed to characteristics corresponding to the first readout mode to calculate the AF evaluation band W2.

The image pickup apparatus described in this embodiment is a single-lens reflex camera of an interchangeable lens type, and accordingly the lens unit 100 is interchangeable. When the lens unit 100 is changed, the defocus MTF information corresponding to each spatial frequency is sent to the camera body 120 for each image pickup optical system and the in-focus position of the captured image and the in-focus position detected by the AF are calculated. Accordingly, highly-accurate correction value can be calculated for each interchangeable lens (lens unit 100). The lens unit 100 may send information such as spatial frequency characteristics of the image pickup optical system, as well as the defocus MTF information, to the camera body 120. The method of utilizing the information is as described above. Similarly, when the camera body 120 is changed, the pixel pitch or the characteristics of the optical low-pass filter may be changed. As described above, since the correction value can be calculated according to the characteristics of the camera body 120 even in this case, highly-accurate correction can be performed.

In the above descriptions, the calculation of the correction value is mainly performed by the camera MPU 125, but the calculation unit is not limited to this. For example, instead of the camera MPU 125, the lens MPU 117 may calculate the correction value. In this case, the various pieces of information described referring to FIGS. 15A to 15F may be sent from the camera MPU 125 to the lens MPU 117, and the lens MPU 117 may calculate the correction value by using the defocus MTF information and the like. In this case, at step S24 in FIG. 1A, the lens MPU 117 may perform the correction for the in-focus position sent from the camera MPU 125 to perform the lens drive.

In this embodiment, the correction value for the AF is calculated by considering the characteristics (vertical and horizontal characteristics, color characteristics, and spatial frequency band characteristics) of the signals for the focus detection. Accordingly, the correction value can be calculated by using the same method, independently of the AF method. Since it is not necessary to store correction method and data to be used for the correction for each AF method, the storage capacity of the data and the calculation load can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The image pickup apparatus of this embodiment is capable of performing highly accurate focus control by correcting a difference, as a focus detection error, between a captured image and a focus state of a focus detection result. Accordingly, this embodiment can provide a control apparatus, an image pickup apparatus, a control method, and a non-transitory computer-readable storage medium which are capable of performing highly accurate focus control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-184771, filed on Sep. 11, 2014, which is hereby incorporated by reference wherein in its entirety.

What is claimed is:

1. A control apparatus comprising:
   at least one processor; and
   a memory,
   wherein the memory contains instructions that, when executed by the at least one processor, cause the at least one processor to function as:
   a first acquirer configured to acquire first information relating to a peak position of a spatial frequency that an image pickup optical system transmits for each spatial frequency,
   a focus detector configured to acquire a focus detection result for a focus control based on an image signal output from an image pickup element which captures an object image through the image pickup optical system and outputs the image signal, the image pickup optical system including a focus lens,
   a second acquirer configured to acquire second information relating to a first spatial frequency and a second spatial frequency, the first spatial frequency being a spatial frequency relating to a process performed when the object image is generated and the second spatial frequency being a spatial frequency relating to a process performed when a signal used for acquiring the focus detection result is generated,
   a third acquirer configured to acquire third information relating to a weighting for each spatial frequency,
   a corrector configured to calculate a correction value based on the first, second, and third information and correct the focus detection result so that a focus state of the object image changes by using the correction value,
   a controller configured to control a movement of the focus lens based on the corrected focus detection result, and
   a generator configured to generate the object image based on the image signal output from the image pickup element,
   wherein the third information contains information set so as to increase the weighting with a decrease of a half-value width of spatial frequency characteristics for each spatial frequency when a focus state is changed.

2. The control apparatus according to claim 1, wherein the first information is information corresponding to a focus lens position for each spatial frequency of an object where the spatial frequency is maximized.

3. The control apparatus according to claim 1, wherein the processor is configured to calculate correction information of focus detection based on the first, second, and third information.

4. The control apparatus according to claim 1, wherein the second information contains information determined by using at least one of spatial frequency characteristics of the object image, spatial frequency characteristics of the image pickup optical system, spatial frequency characteristics of an optical low-pass filter, spatial frequency characteristics of image pickup signals and focus detection signals output from the image pickup element, and spatial frequency characteristics relating to a sensitivity of the image pickup signals and a digital filter used for processing of the focus detection signals.

5. The control apparatus according to claim 1, wherein the third information contains information set so as to increase the weighting with an increase of the spatial frequency.

6. A control method comprising:
   determining first information relating to a peak position of a spatial frequency that an image pickup optical system transmits for each spatial frequency;
   calculating a focus detection result for a focus control based on an image signal output from an image pickup element which captures an object image through the image pickup optical system and outputs the object image, the image pickup optical system including a focus lens;
   calculating second information relating to a first spatial frequency and a second spatial frequency, the first spatial frequency being a spatial frequency relating to a process performed when the object image is generated and the second spatial frequency being a spatial frequency relating to a process performed when a signal used for acquiring the focus detection result is generated;

calculating third information relating to a weighting for each spatial frequency;

calculating a correction value based on the first, second, and third information and correcting the focus detection result so that a focus state of the object image changes by using the correction value;

controlling a movement of the focus lens based on the corrected focus detection result; and generating the object image based on the image signal output from the image pickup element, wherein the third information contains information set so as to increase the weighting with a decrease of a half-value width of spatial frequency characteristics for each spatial frequency when a focus state is changed.

7. A non-transitory computer-readable storage medium storing a program which causes a computer to execute a process comprising:

determining first information relating to a peak position of a spatial frequency that an image pickup optical system transmits for each spatial frequency;

calculating a focus detection result for a focus control based on an image signal output from an image pickup element which captures an object image through the image pickup optical system and outputs the object image, the image pickup optical system including a focus lens;

calculating second information relating to a first spatial frequency and a second spatial frequency, the first spatial frequency being a spatial frequency relating to a process performed when the object image is generated and the second spatial frequency being a spatial frequency relating to a process performed when a signal used for acquiring the focus detection result is generated;

calculating third information relating to a weighting for each spatial frequency;

calculating a correction value based on the first, second, and third information and correcting the focus detection result so that a focus state of the object image changes by using the correction value;

controlling a movement of the focus lens based on the corrected focus detection result; and generating the object image based on the image signal output from the image pickup element, wherein the third information contains information set so as to increase the weighting with a decrease of a half-value width of spatial frequency characteristics for each spatial frequency when a focus state is changed.

* * * * *